United States Patent [19]
Das

[11] Patent Number: 5,963,165
[45] Date of Patent: Oct. 5, 1999

[54] TRANSMIT-RECEIVE TELECOMMUNICATION SYSTEM WITH HIGH EFFICIENCY MULTIBEAM EQUALLY LOADED TRANSMITTERS

[75] Inventor: Satyendranath Das, P.O. Box 574, Mt. View, Calif. 94042

[73] Assignees: Manoj Bhatta Charyya; Satyendranath Das; a part interest

[21] Appl. No.: 08/998,747

[22] Filed: Dec. 29, 1997

Related U.S. Application Data

[63] Continuation-in-part of application No. 08/651,744, May 22, 1996, and a continuation of application No. 08/818,338, Mar. 14, 1997.

[51] Int. Cl.[6] .................................................. H04B 7/185
[52] U.S. Cl. ........................................................ 342/353
[58] Field of Search ................................ 342/353, 354, 342/368; 455/13.3

[56] References Cited

U.S. PATENT DOCUMENTS

| | | |
|---|---|---|
| 4,232,266 | 11/1980 | Acampora . |
| 4,689,625 | 8/1987 | Barmat ..................................... 342/356 |
| 5,407,905 | 4/1995 | Das ........................................... 505/210 |
| 5,548,295 | 8/1996 | Lo Forti et al. ........................ 342/373 |
| 5,550,550 | 8/1996 | Das ........................................... 342/353 |

*Primary Examiner*—Theodor M. Blum

[57] ABSTRACT

A design of equally loaded, under varying traffic load conditions, high efficiency power amplifiers for a multibeam communication system is presented. Output beam contains signals of only one beam corresponding to its input beam. Signals arriving at the feed elements for an input beam "b", of the 1 to N beams, corresponding to an input beam "b", arrive in phase and add together, while signals arriving at said feed elements for the output beam "b" corresponding to the remaining input beams arrive in antiphase and cancel one another by appropriate selection of two set of fixed input and output phase shifters. The output beams are shaped to produce a small reduction of power at the crossover point of adjacent beams. MMIC and high Tc superconducting designs, including the design of high Tc superconducting reflector antenna, are presented.

18 Claims, 35 Drawing Sheets

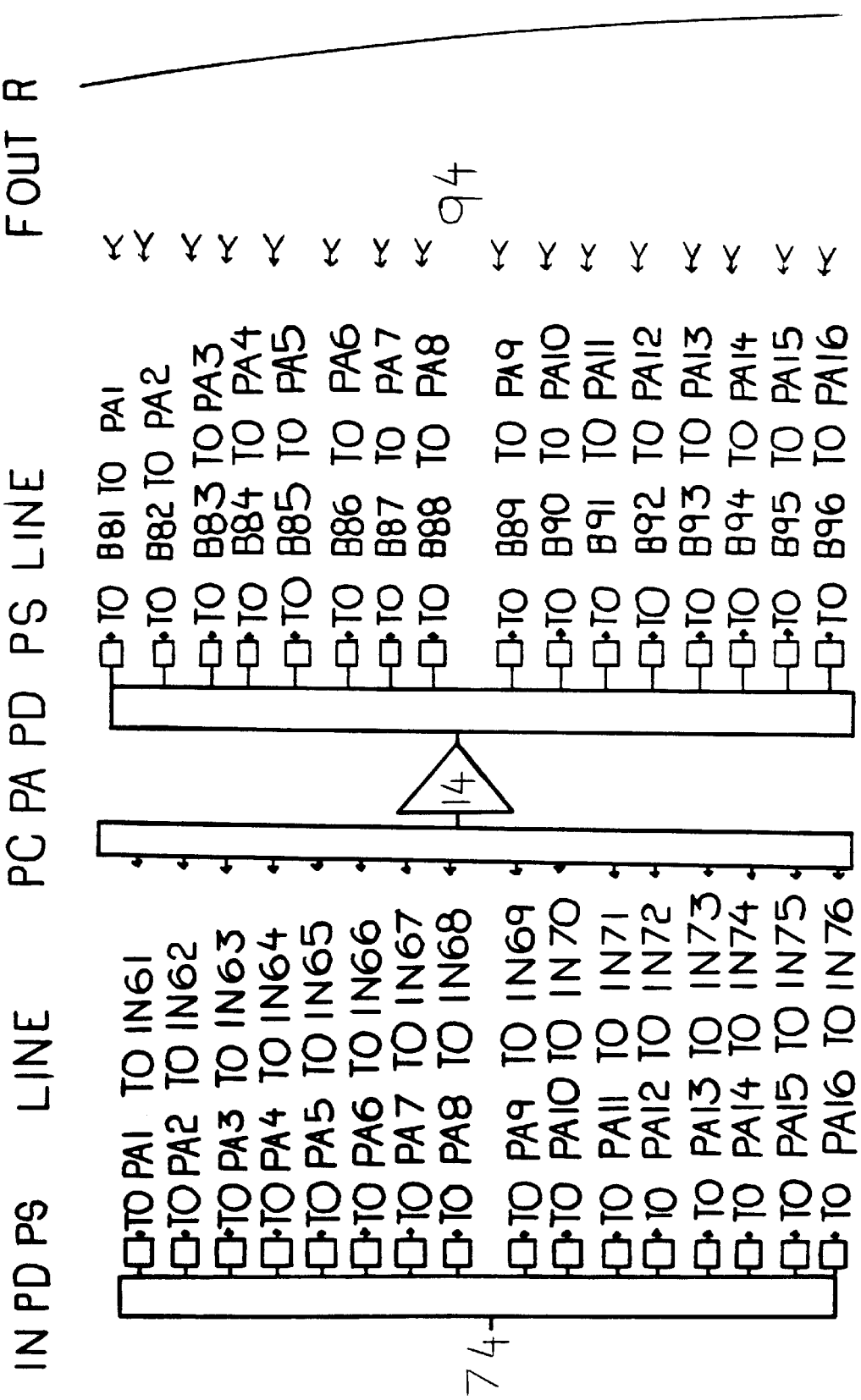

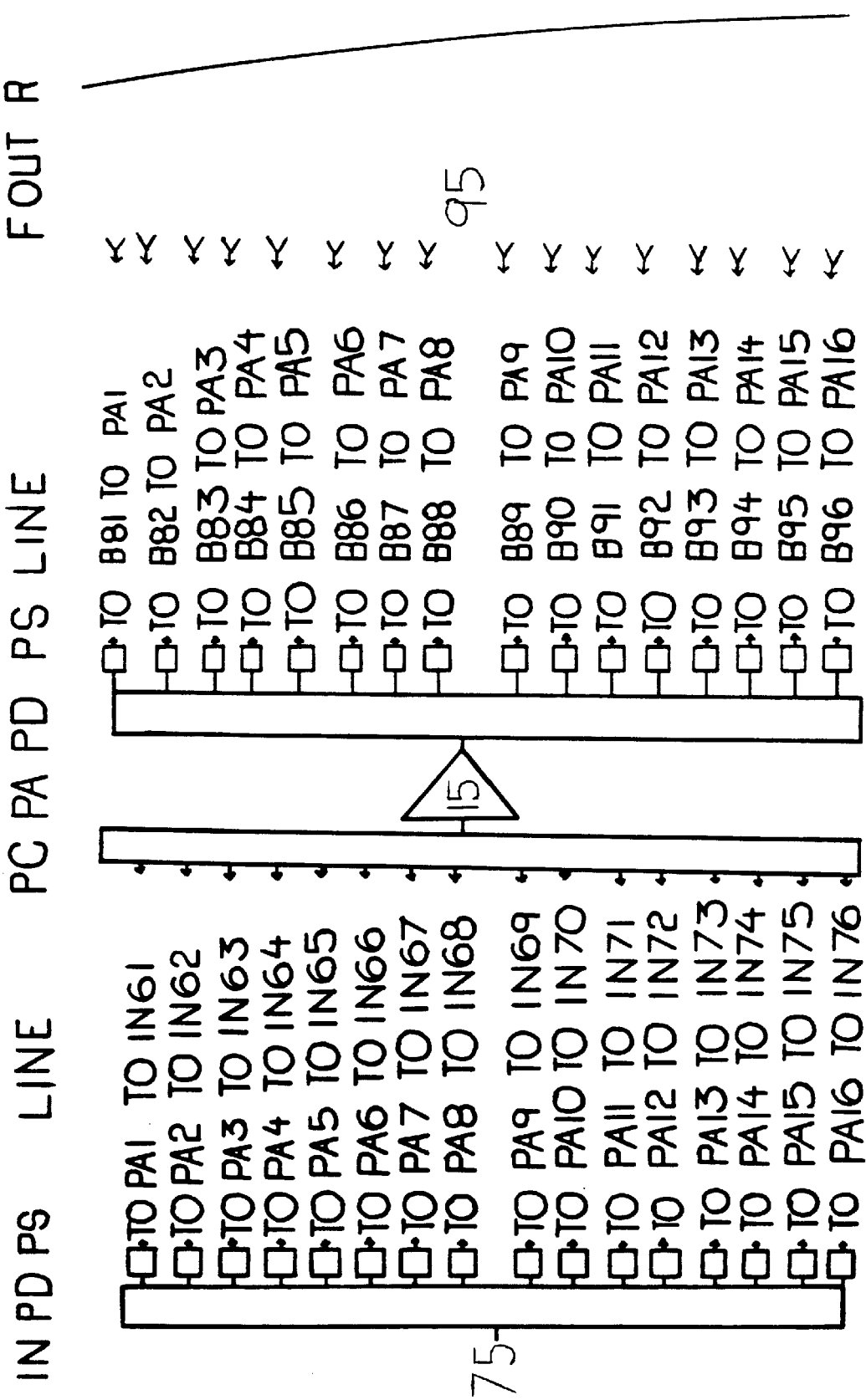

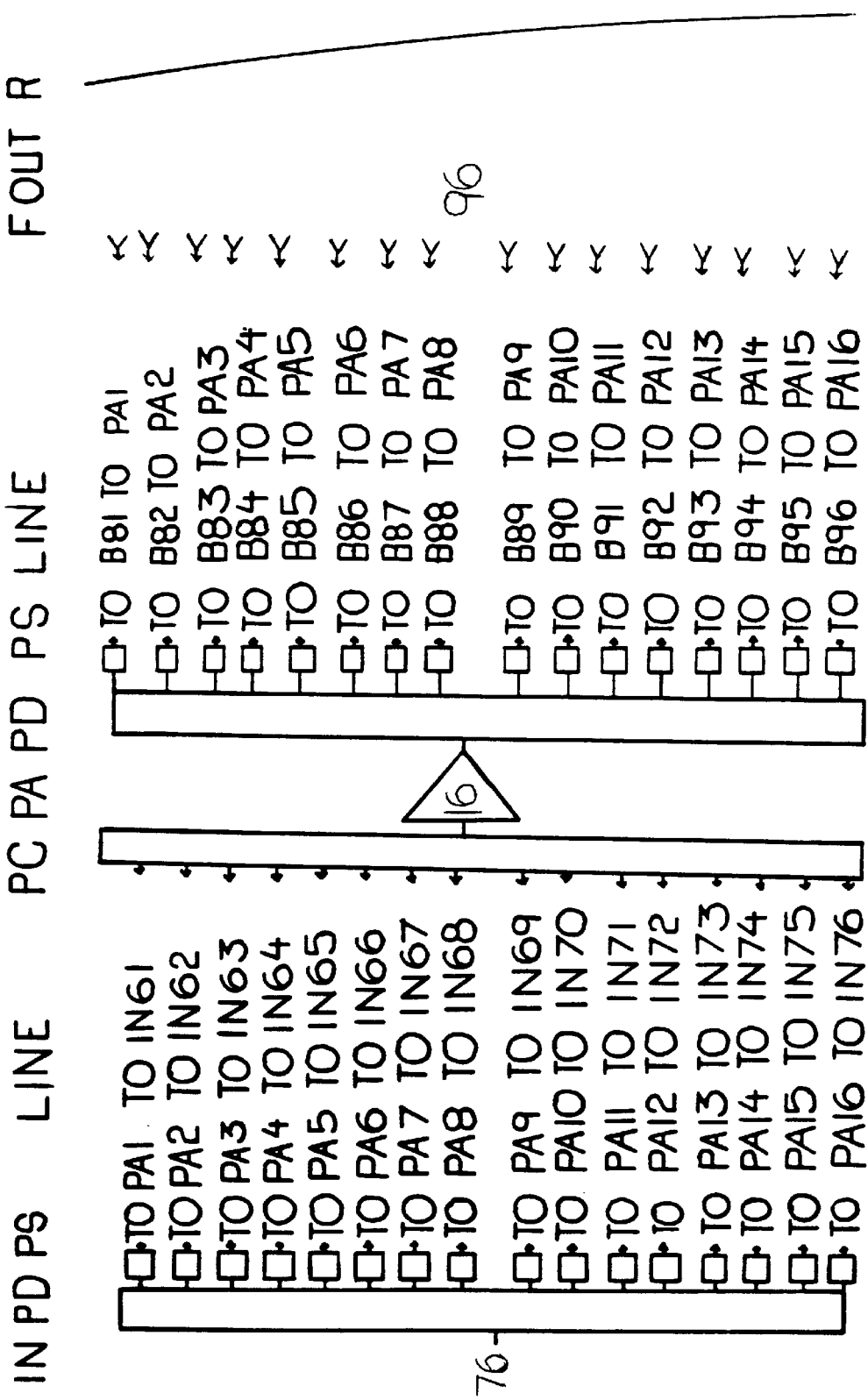

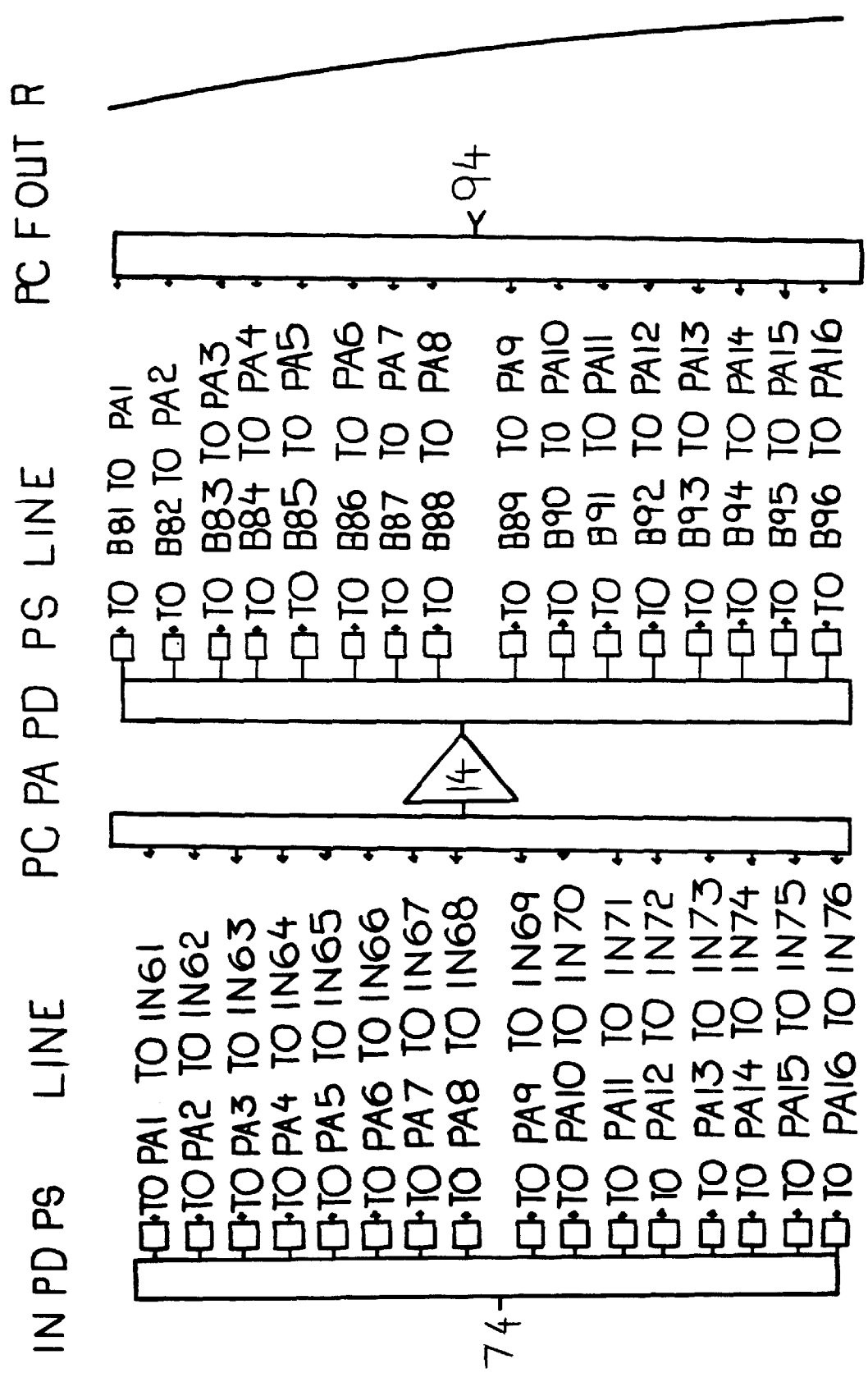

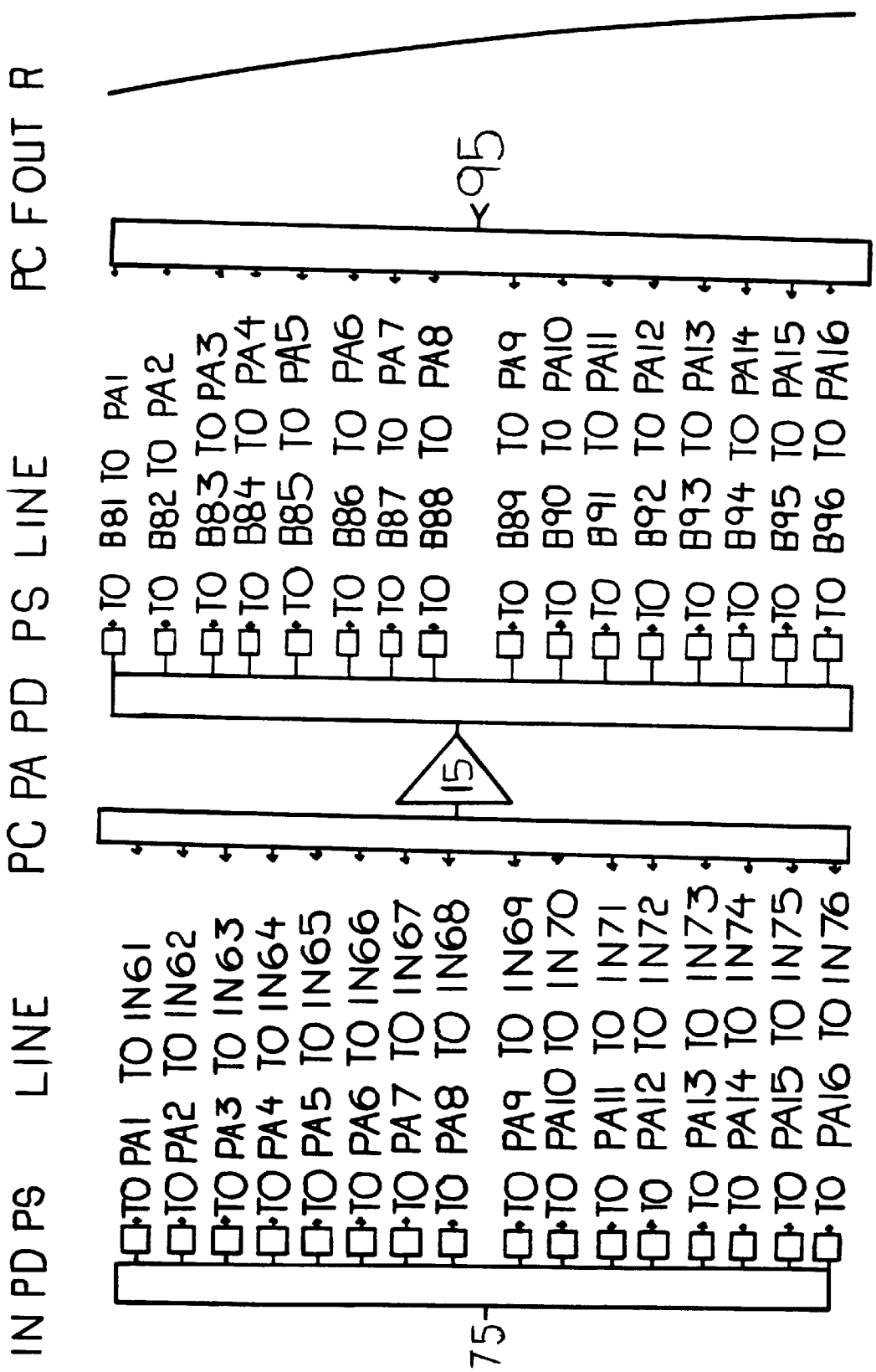

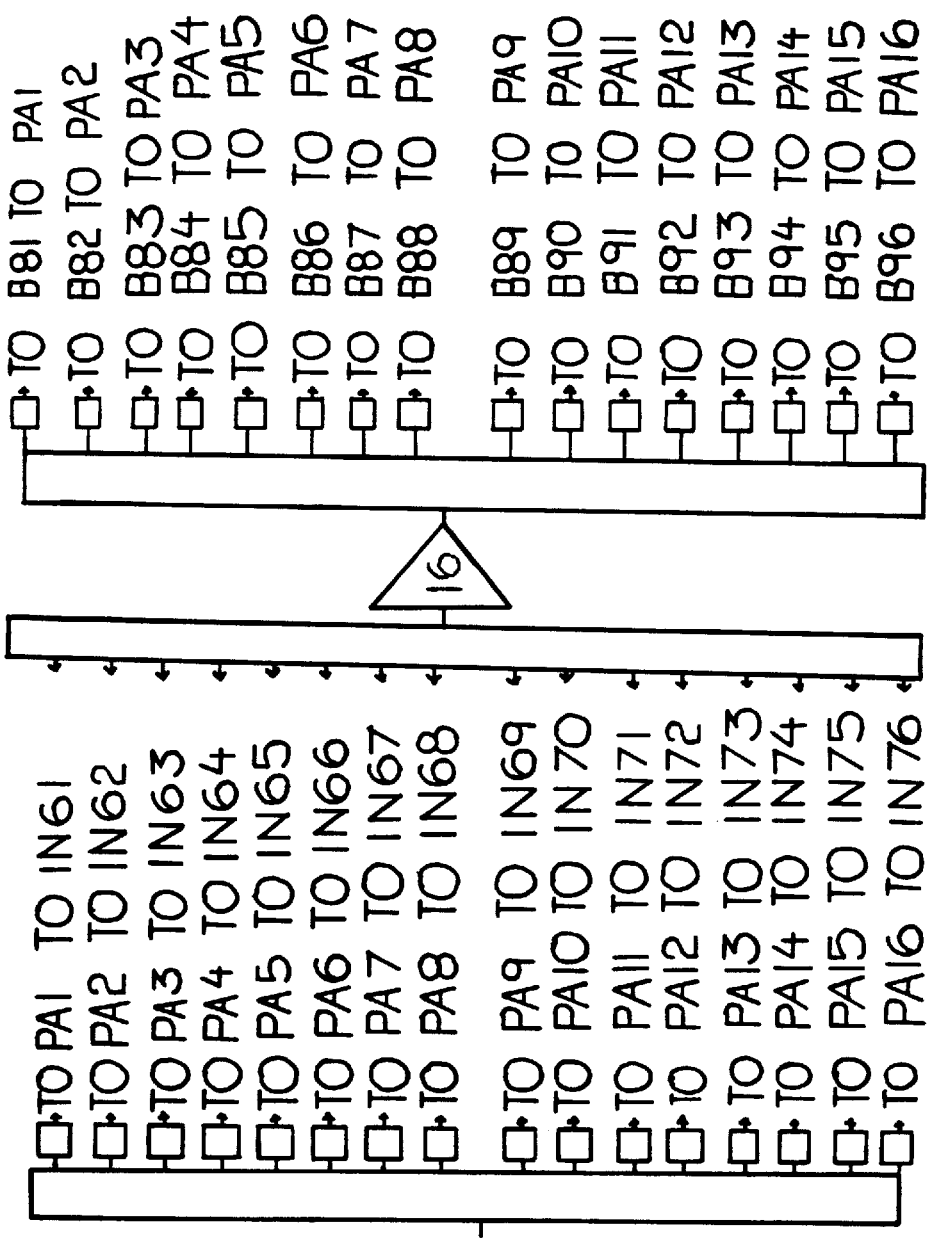

TRANSMIT-RECEIVE TELECOMMUNICATION SYSTEM WITH HIGH EFFICIENCY MULTIBEAM EQUALLY LOADED TRANSMITTERS

This application is a continuation-in-part of the application Ser. No. 08/651,744 filed May 22, 1996 and a continuation of the application Ser. No. 08/818,338, filed Mar. 14, 1997.

FIELD OF INVENTION

1. The present invention relates to multibeam transmit-receive telecommunication systems.

2. In telecommunications, it is sometimes necessary to transmit and receive using multiple beams.

DESCRIPTION OF PRIOR ART

Das discussed satellite multibeam antennas. S. Das, "Multibeam Antennas Improve Satellite Cummunications", pp. 42–55, MSN, December 1977. "An Adaptive Multiple Beam System Concept", IEEE Journal of Selected Areas in Communications, vol. SAC-4, No.5, p. 630, 1987 has been discussed. U.S. Pat. Nos. 4,907,004 and 5,550,550 have been issued. The difference between the patent and the present application is that U.S. Pat No. 5,550,550 had output switches. There are two issues related to switches: (1) the mean time between failures and (2) the time required to switch from one position to the next adjacent position. The present application uses output power combiners eliminating the output switches of U.S. Pat. No. 5,550,550 and the associated issues.

SUMMARY OF THE INVENTION

The purpose of the present invention is to keep the different transmitters of a telecommunication system equally loaded during dynamic traffic conditions and thus to minimise the prime power requirements of and increase the efficiency of the system.

This kind of multiple beam communication systems can be used in Odyssey, Irridium, Globalstar, regional cellular satellite, INTELSAT, INMARSAT, domestic satellites, broadcasting satellites, mobile satellites, personal communications satellites and other civilian and military satellites, terrestrial systems, shipboard systems, airborne systems, spaceborne systems where traffic loads vary dynamically. For communication in many European countries, a small number of beams are required. For countries like China, Canada, some countries of South America and U.S.A, a moderate number of beams are required. For coverage of ocean areas by INMARSAT a larger number of beams are required.

Each input beam is fed to a power divider the number of outputs of which is equal to the number of power amplifiers. Each power amplifier input is connected to a power combiner the number of inputs of which is equal to the number of input beams. Equal amount of input signal from each input beam is fed to each power amplifier, loading each power amplifier equally under dynamic traffic loading conditions. Each power amplifier output is fed to a power divider the number of outputs of which is equal to the number of output beams. Output of a power amplifier is fed to a feed element of each beam. Appropriate sets of phase shifters are used both after each input power divider placed after each input beam and after each output power divider placed after each amplifier so that the different portions of signal from one input beam are in phase only at the corresponding elements of one output beam and thus they add together. The different portions of signal from the same input beam are out of phase at the feed elements of another beam and thus they cancel one another. Each output beam carries signal of one input beam only. The number of feed elements in a cluster of any output beam is more than one and can be as many as the number of beams.

Another objective of this invention is to implement a portion or the entire system in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another objecvtive is to build very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Shen, C. Wilker, P. Pang and W. C. Holstein, "High Tc Suoerconducting-sapphire Microwave resonator with Extremely High Q-Values up To 90 K," IEEE Trans. MTT vol. 40, No. 12, pp. 2424–2432, 1992. U.S. Pat. Nos. 5,407,904 and 5,407,905 have been issued on high Tc superconducting microwave devices.

One objective of this invention is to save the power requirement of a telecommunication system. The actual savings can be calculated only in specific cases. For a system with a large number of beams, clusters of a smaller number of beams could be used. For example for a 90 beam system, 11 clusters of 8-beams and one cluster of a 2 beam system could be used. The relation between the power, weight and cost of a satellite system has been studied by Grady H. Stevens, Role of New Technology Satellites in Providing T1 and Higher Rate Service, NASA, LeRC, Cleveland, Ohio, January, 1994. On p. 26 of the cited report, Loral estimated for BISDN the satellite dry mass at 1548 kg and the array power at 3204 watts. Also the nonrecurring cost was estimated as $269 M and the recurring cost $419 M (2 spacecraft buy '93 $). The total cost was $688 M.

With these and other objectives in view, as will be more particularly pointed out in detail in the appended claims, refernce is now made to the following description taken in connection with accompanying diagrams.

BRIEF DESCRIPTION OF THE DRAWINGS

FIG. 15 is a portion of a schematic diagram of a typical 16 beam embodiment of this invention including an input beam 74, a power amplifier 14 and an output beam 94.

FIG. 16 is a portion of a schematic diagram of a typical 16 beam embodiment of this invention including an input beam 75, a power amplifier 15 and an output beam 95.

FIG. 17 is a portion of a schematic diagram of a typical 16 beam embodiment of this invention including an input beam 76, a power amplifier 16 and an output beam 96.

FIG. 34 is a portion of a schematic diagram of a typical 16 beam second embodiment of this invention including an input beam 74, a power amplifier 14 and an output beam 94.

FIG. 35 is a portion of a schematic diagram of a typical 16 beam second embodiment of this invention including an input beam 75, a power amplifier 15 and an output beam 95.

FIG. 36 is a portion of a schematic diagram of a typical 16 beam second embodiment of this invention including an input beam 76, a power amplifier 16 and an output beam 96.

FIG. 37 depicts a typical receiving system.

DESCRIPTION OF THE PREFERRED EMBODIMENT

Figure 1:
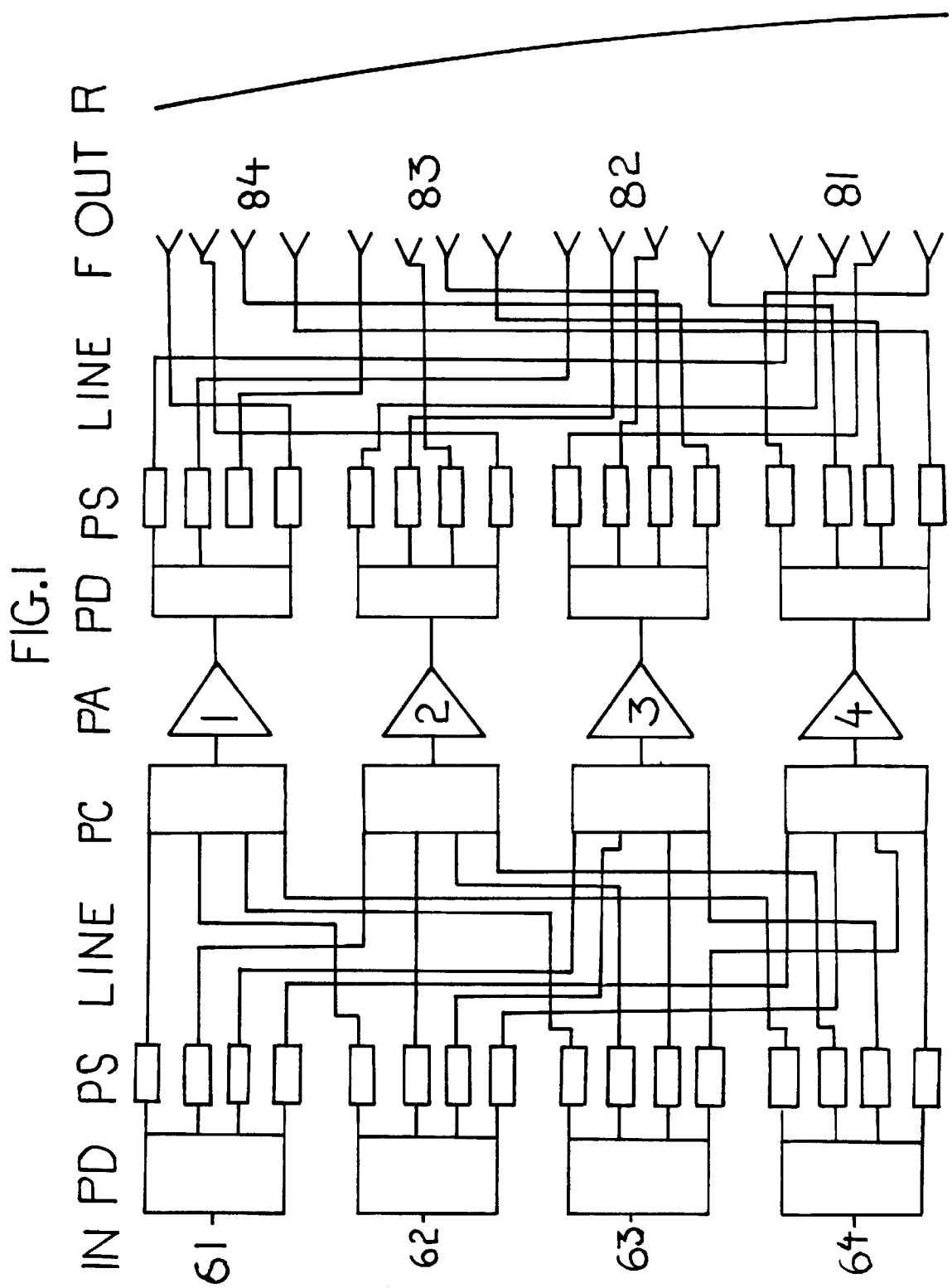
FIG. 1 is a schematic diagram of a typical 4 beam embodiment of this invention.

Referring now to the drawings, FIG. 1 depicts a 4-beam telecommunications transmitter system. Each input beam (IN) is connected to a 1 to 4 way, zero phase difference, power divider (PD) so that equal power from each beam is connected to each of the four power amplifiers (PA). A 4 to 1 way, zero phase difference, power combiner (PC) is connected to the input of each of the four power amplifiers so that an equal amount of signal from each input beam is connected to each power amplifier.

Each top or the 1st line of each input power divider, connected to each input beam 61 through 64, is connected, each through a separate phase shifter & PC, to the power amplifier 1. Each next to the top or the 2nd line of each input power divider, connected to each input beam 61 through 64, is connected, each through a separate phase shifter & PC, to the power amplifier 2. Each 3rd line of each input power divider, connected to each input beam 61 through 64, is connected, each through a separate phase shifter & PC, to the power amplifier 3. Each 4th line of each input power divider, connected to each input beam 61 through 64, is connected, each through a separate phase shifter & PC, to the power ampllifier 4.

Each power amplifier is thus equally loaded under dynamically varying traffic load condtions. One input 4 output, zero phase difference, output power divider (PD) is connected to the output of each power ampifier so that the output of each power amplifier is transmitted to the feed elements of each output beam. A first set of fixed phase shifters (PS) are connected at the output of each power divider which is placed after each input beam. A second set of fixed phase shifters (PS) are connected at the output of each output power divider which is placed after each power amplifier. The phase shifters, in some cases, can be extensions of equal length connecting lines by one, two or three quarter wavelengths at an operating frequency of the multibeam transmitters.

Typical values of phase shifts in the input and the corresponding output, for a 4 beam system, are shown in the following table I. These phase shifters are located sequentially, from top to bottom. Namely, a phase shift of 0 degrees is provided on the top line of the power divider connected to the input beam 61. A phase shift of 90 degrees is connected to the second, from the top, line of the power divider connected to the input beam 61. The process is continued.

TABLE I

4 BEAM SYSTEM

| INPUT BEAM | INPUT PHASE | OUTPUT PHASE | OUTPUT BEAM |
|---|---|---|---|
| 61 | 0 | 0 | 84 |
|  | 90 | 270 |  |
|  | 90 | 270 |  |
|  | 180 | 180 |  |
| 62 | 90 | 270 | 83 |
|  | 180 | 180 |  |
|  | 0 | 0 |  |
|  | 90 | 270 |  |
| 63 | 90 | 270 | 82 |
|  | 0 | 0 |  |
|  | 180 | 180 |  |
|  | 90 | 270 |  |
| 64 | 180 | 180 | 81 |
|  | 90 | 270 |  |
|  | 90 | 270 |  |
|  | 0 | 0 |  |

Each top or the 1st line of each output power divider connected to each power amplifier 1 through 4, is connected, through a separate phase shifter, to the output beam 81. Each next to the top or the 2nd line, from top, of each output power divider, connected to each power amplifier 1 through 4, is connected, each through a separate phase shifter, to the output beam 82. Each 3rd line, from top, of each PD, connected to each power amplifier 1 through 4, is connected, each through a separate phase shifter, to the output beam 83. Each 4th line, from top. of each output power divider, each connected to each power amplifier 1 through 4, is connected, each through a separate phase shifter, to the output beam 84.

At each transmit beam, signal of only one input beam is in phase by appropriate selection of the set of phase shifters. For example, at the output beam position 81, only signals of the input beam 61 amplified by each of the four amplifiers are in phase. The output signals corresponding to the input beam 62 are out of phase at beam position 81 (B81) from the different power ampifiers (PA) and as such, they cancel one another. The output signals corresponding to the input beam 63 are out of phase at the beam position 81 and as such, they cancel one another. The output signals, from different power amplifiers, corresponding to the input beam 64 are out of phase at the output beam position 81 and as such, they cancel one another. Similarly, the signal at the output beam position 82 is due to only the signal of the input beam 62. The signal at the output beam 83 is due to only the signal of the input beam 63. The signal at the output beam position 84 is due to only the signal of the input beam 64.

The four feed elements, at the output beam position 81, are placed close together at or near the focal plane of a reflector. A shaped beam is formed in space and is focussed in one specific geographic area. The four feed elements, located at the output beam position 82, are placed close together at or near the focal plane, separate from the location of the first four feed elements, of the previously mentioned reflector antenna. A second shaped beam is formed in space and is focussed in another geographical area adjacent but different from that area illuminated by output beam 81. There is a small reduction of power at the crossover point of the output beams 81 and 82. The four feed elements, located at the output beam position 83, are placed close together at or near the focal plane, separate from the location of the first eight feed elements associated with output beams 81 and 82, of the previously mentioned reflector antenna. A third shaped beam is formed in space and is focussed in another geographical area adjacent but different from that area illuminated by output beams 81 and 82. There is a small reduction of power at the crossover point of the output beams 82 and 83. The four feed elements, located at the output beam position 84, are placed close together at or near the focal plane, separate from the location of the first twelve feed elements associated with output beams 81, 82 and 83, of the previously mentioned reflector antenna (R). A fourth shaped beam is formed in space and is focussed in another geographical area adjacent but different from that area illuminated by output beams 81, 82 and 83. There is a small reduction of power at the crossover point of the output beams 83 and 84.

Figure 2:
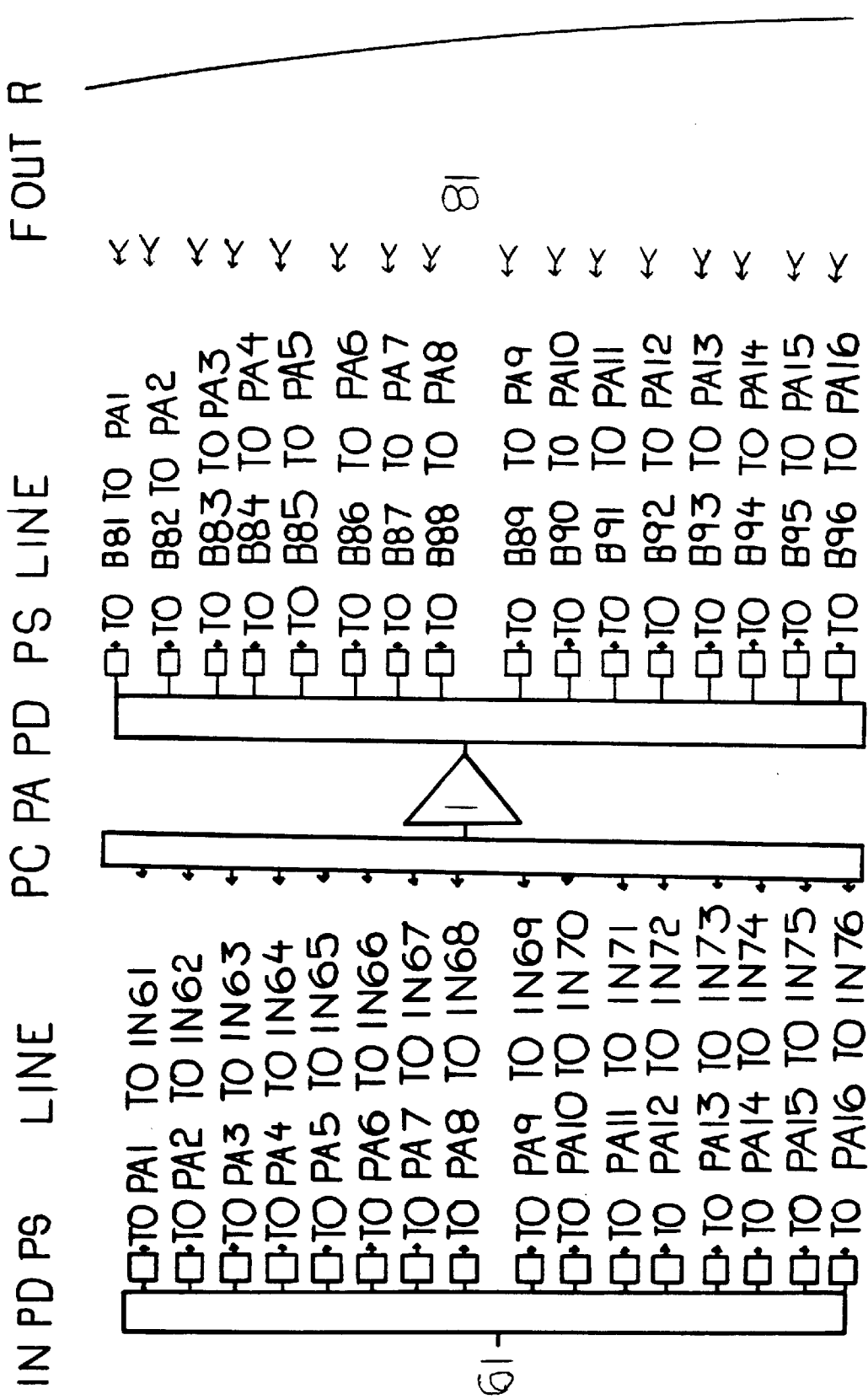
FIG. 2 is a portion of a schematic diagram of a typical 16 beam embodiment of this invention including an input beam 61, a power amplifier 1 and an output beam 81.

FIG. 2 throuh FIG. 17 depict a 16-beam embodiment of this invention. Each figure contains an input (IN), an input 1 to 16 way, zero phase shift, power divider (PD), input phase shifters (PS), a 16 to 1 way, zero phase shift power combiner (PC), a power amplifier (PA), a 1 to 16 way output power divider, output phase shifters (PS), feed (F) elements, an output (OUT) beam and a reflector antenna (R). Each figure also contains connecting lines (LINE) both at the input of the power amplifier section and at the output of the power amplifier section. Each input beam signal is divided into 16 equal parts one for each of the 16 power ampifiers. Each line, at the output of the power divider is marked with an arrow. To PA means the line is going to a power amplifier (PA). A different number is associated with each line indicating the number of the power amplifier to which the line is connected. TO PA1 means that this line is connected to the power amplifier 1. TO PA 16 means that this line is connected to the power amplifier 16. TO IN means to the power divider of the input beam. The input lines to the input beams are also marked with arrows. The number associated with TO IN refers to the input beam. TO IN61 means to the power divider of the input beam 61. TO IN 76 means to the power divider of the input beam 76. Each power amplifier receives 16 inputs, one from each input beam. One sixteenth of each input beam is fed to each power amplifier. Consequently, Each power amplifier has equal traffic load under all dynamic load conditions. If, for example, the traffic in input beam 61 is increased, the loading of each power amplifier is increased by equal proportion. The loading of each power amplifier remains equal. The differences in the FIGS. 2 through 17 are related to the number of input beam, the number of the power amplifier and the number of the output beam as detailed in the following table II.

TABLE II

| FIG. | IN | PA | OUT |
|---|---|---|---|
| 2 | 61 | 1 | 81 |
| 3 | 62 | 2 | 82 |
| 4 | 63 | 3 | 83 |
| 5 | 64 | 4 | 84 |
| 6 | 65 | 5 | 85 |
| 7 | 66 | 6 | 86 |
| 8 | 67 | 7 | 87 |
| 9 | 68 | 8 | 88 |
| 10 | 69 | 9 | 89 |
| 11 | 70 | 10 | 90 |
| 12 | 71 | 11 | 91 |
| 13 | 72 | 12 | 92 |
| 14 | 73 | 13 | 93 |
| 15 | 74 | 14 | 94 |
| 16 | 75 | 15 | 95 |
| 17 | 76 | 16 | 96 |

Typical values of phase shifts in the input and the corresponding output, for a 16 beam system, are shown in the following table III. These phase shifters are located, sequentially, from top to bottom. Namely, a phase shift of 0 degrees is provided on the top line of the power divider connected to the input beam 61. A phase shift of 90 degrees is connected to the second, from the top, line of the power divider connected to the input beam 61. The process is continued.

TABLE III

16 BEAM SYSTEM

| IN BEAM | IN PHASE | OUT PHASE | OUT BEAM |
|---|---|---|---|
| 61 | 0 | 0 | 81 |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | — | — |  |
| 62 | 90 | 270 | 82 |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | 0 | 0 |  |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | — | — |  |
| 63 | 90 | 270 | 83 |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
|  | 180 | 180 |  |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | — | — |  |
| 64 | 180 | 180 | 84 |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
|  | — | — |  |
| 65 | 90 | 270 | 85 |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 0 | 0 |  |
|  | 180 | 180 |  |
|  | — | — |  |
| 66 | 180 | 180 | 86 |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
|  | 90 | 270 |  |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | — | — |  |
| 67 | 180 | 180 | 87 |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | 270 | 90 |  |
|  | 0 | 0 |  |
|  | 180 | 180 |  |
|  | 270 | 90 |  |

TABLE III-continued

16 BEAM SYSTEM

| IN BEAM | IN PHASE | OUT PHASE | OUT BEAM |
|---|---|---|---|
|  | 180 | 180 |  |
|  | 270 | 90 |  |
|  | 90 | 270 |  |
|  | 180 | 180 |  |
|  | — | — |  |
| 68 | 270 | 90 | 88 |
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | — | — |  |
| 69 | 90 | 270 | 89 |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | — | — |  |
| 70 | 180 | 180 | 90 |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | 90 | 270 |  |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | — | — |  |
| 71 | 180 | 180 | 91 |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | 270 | 90 |  |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | — | — |  |
| 72 | 270 | 90 | 92 |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | — | — |  |
| 73 | 180 | 180 | 93 |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | — | — |  |
| 74 | 270 | 90 | 94 |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | 180 | 180 |  |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | — | — |  |
| 75 | 270 | 90 | 95 |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  |
|  | 0 | 0 |  |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | — | — |  |
| 76 | 0 | 0 | 96 |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | 270 | 90 |  |

TABLE III-continued

16 BEAM SYSTEM

| IN BEAM | IN PHASE | OUT PHASE | OUT BEAM |
|---------|----------|-----------|----------|
|         | 180      | 180       |          |
|         | 180      | 180       |          |
|         | 90       | 270       |          |
|         | 180      | 180       |          |
|         | 90       | 270       |          |
|         | 90       | 270       |          |
|         | 0        | 0         |          |

The top or the first line of the power divider, connected to the input beam 61, is connected through a phase shifter & PC, to the input of the power amplifier 1. The top or the first line of the power divider, connected to the input beam 62, is connected, through a phase shifter & PC, to the input of the power amplier 1. Similarly, each of the top or the first line of the power dividers, connected to each input beam 63 through 76, is connected, each through a different phase shifter & same PC to the input power amplifier 1.

The line next to the top or the 2nd line of the power divider, connected to the input beam 61, is connected, through a phase shifter & PC, to the input of the power amplifier 62. The line next to the top or the 2nd line of the power divider, connected to the input beam 62, is connected, through a phase shifter & PC, to the input of the power amplifier 2. Similarly, each of the next to the top or the 2nd line of each power divider, connected to each input beam 63 through 76, is connected, each through a different phase shifter & same PC, to the input of the power amplifier 2.

The 3rd line from the top of the power divider, connected to the input beam 61 is connected, through a phase shifter & PC, to the input of the power amplifier 3. The 3rd line from the top of the power divider, connected to the input beam 62, is connected, through a phase shifter & PC to the input of the power amplifier 3. Similarly, each of the 3rd line from the top of each power divider, connected to each input beam 63 to 76, is connected, each through a different phase shifter & same PC, to the input of the power amplier 3.

The 4th line from the top of the power divider, connected to the input beam 61, is connected, through a phase shifter & PC, to the input of the power amplifier 4. The 4th line from the top of the power divider, connected to the input beam 62, is connected, through a phase shifter & PC, to the input of the power amplifier 4. Similarly, each 4th line from each power divider, connected to each input beam 63 through 76, is connected, each through a different phase shifter & same PC to the input of the power amplifier 4.

The 5th line from the top of the power divider, connected to the input beam 61, is connected, through a phase shifter & PC, to the input of the power amplifier 5. The 5th line from the top of the power divider, connected to the input beam 62, is connected, through a phase shifter & PC, to the input of the power amplifier 5. Similarly, each 5th line from each power divider, connected to each input beam 63 through 76, is connected, each through a different phase shifter & same PC, to the input of the power amplifier 5.

The 6th line from the top of the power divider, connected to the input beam 61, is connected, through a phase shifter & PC, to the input of the power amplifier 6. The 6th line from the top of the power divider, connected to the input beam 62, is connected, through a phase shifter & PC, to the input of the power amplifier 6. Similarly, each 6th line from each power divider, connected to each input beam 63 through 76, is connected, each through a different phase shifter & same PC to the input of the power amplifier 6.

The 7th line from the top of the power divider, connected to the input beam 61, is connected, through a phase shifter & PC, to the input of the power amplifier 7. The 7th line from the top of the power divider, connected to the input beam 62, is connected, through a phase shifter & PC, to the input of the power amplifier 7. Similarly, each 7th line from each power divider, connected to each input beam 63 through 76, is connected, each through a different phase shifter & same PC to the input of the power amplifier 7.

The 8th line from the top of the power divider, connected to the input beam 61, is connected, through a phase shifter & PC, to the input of the power amplifier 8. The 8th line from the top of the power divider, connected to the input beam 62, is connected, through a phase shifter & PC, to the input of the power amplifier 8. Similarly, each 8th line from each power divider, connected to each input beam 63 through 76, is connected, each through a different phase shifter & same PC to the input of the power amplifier 8.

The 9th line from the top of the power divider, connected to the input beam 61, is connected, through a phase shifter & PC, to the input of the power amplifier 9. The 9th line from the top of the power divider, connected to the input beam 62, is connected, through a phase shifter & PC, to the input of the power amplifier 9. Similarly, each 9th line from each power divider, connected to each input beam 63 through 76, is connected, each through a different phase shifter to the input of the power amplifier 9.

The 10th line from the top of the power divider, connected to the input beam 61, is connected, through a phase shifter & PC, to the input of the power amplifier 10. The 10th line from the top of the power divider, connected to the input beam 62, is connected, through a phase shifter & PC, to the input of the power amplifier 10. Similarly, each 10th line from each power divider, connected to each input beam 63 through 76, is connected, each through a different phase shifter & same PC to the input of the power amplifier 10.

The 11th line from the top of the power divider, connected to the input beam 61, is connected, through a phase shifter & PC, to the input of the power amplifier 11. The 11th line from the top of the power divider, connected to the input beam 62, is connected, through a phase shifter & PC, to the input of the power amplifier 11. Similarly, each 11th line from each power divider, connected to each input beam 63 through 76, is connected, each through a different phase shifter & same PC to the input of the power amplifier 11.

The 12th line from the top of the power divider, connected to the input beam 61, is connected, through a phase shifter & PC, to the input of the power amplifier 12. The 12th line from the top of the power divider, connected to the input beam 62, is connected, through a phase shifter & PC, to the input of the power amplifier 12. Similarly, each 12th line from each power divider, connected to each input beam 63 through 76, is connected, each through a different phase shifter & same PC to the input of the power amplifier 12.

The 13th line from the top of the power divider, connected to the input beam 61, is connected, through a phase shifter & PC, to the input of the power amplifier 13. The 13th line from the top of the power divider, connected to the input beam 62, is connected, through a phase shifter & PC, to the input of the power amplifier 13. Similarly, each 13th line from each power divider, connected to each input beam 63 through 76, is connected, each through a different phase shifter & same PC to the input of the power amplifier 13.

The 14th line from the top of the power divider, connected to the input beam 61, is connected, through a phase shifter & PC, to the input of the power amplifier 14. The 14th line from the top of the power divider, connected to the input beam 62, is connected, through a phase shifter & PC, to the input of the power amplifier 14. Similarly, each 14th line from each power divider, connected to each input beam 63 through 76, is connected, each through a different phase shifter & same PC to the input of the power amplifier 14.

The 15th line from the top of the power divider, connected to the input beam 61, is connected, through a phase shifter & PC, to the input of the power amplifier 15. The 15th line from the top of the power divider, connected to the input beam 62, is connected, through a phase shifter & PC, to the input of the power amplifier 15. Similarly, each 15th line from each power divider, connected to each input beam 63 through 76, is connected, each through a different phase shifter & same PC to the input of the power amplifier 15.

The 16th line from the top of the power divider, connected to the input beam 61, is connected, through a phase shifter & PC, to the input of the power amplifier 16. The 16th line from the top of the power divider, connected to the input beam 62, is connected, through a phase shifter & PC, to the input of the power amplifier 16. Similarly, each 16th line from each power divider, connected to each input beam 63 through 76, is connected, each through a different phase shifter & same PC to the input of the power amplifier 16.

The top or the 1st line from the output power divider (PD), connected to the output of the power apmlifier 1, is connected, through a phase shifter, to the output beam 81. The top or the 1st line from the output power divider (PD), connected to the output of the power amplifier 2, is connected, through a phase shifter, to the output beam 81. Similarly, the top or the 1st line of each output power divider, connected to each output of the power amplifier 3 through to 16, is connected, each through a different phase shifter, to the output beam 81 respectively.

The next to the top or the 2nd line from the output power divider (PD), connected to the output of the power amplifier 1, is connected, through a phase shifter, to the output beam 82. The next to the top or the 2nd line of the output power divider (PD), connected to the output of the power amplifier 2, is connected, through a phase shifter, to the output beam 82. Similarly, the next to the top or the 2nd line of each output power divider (PD), connected to the output of each power amplifier 3 through to 16, is connected, each through a different phase shifter, to the output beam 82 respectively.

The 3rd line from the top of the output power divider (PD), connected to the output of the power amplifier 1, is connected, through a phase shifter, to the output beam 83. The 3rd line from the top of the output power divider (PD), connected to the output of the power amplifier 2, is connected, through a phase shifter, to the output beam 83. Similarly, each 3rd line from the top of each power divider (PD), connected to the output of each power amplifier 3 through to 16, is connected, each through a different phase shifter, to the output beam 83 respectively.

The 4th line from the top of the output power divider (PD), connected to the output of the power amplifier 1, is connected, through a phase shifter, to the output beam 84. The 4th line from the top of the output power divider, connected to the output of the power amplifier 2, is connected, through a phase shifter, to the output beam 84. Similarly, each 4th line from the top of each power divider (PD), connected to the output of each power amplifier 3 through to 16, is connected, each through a different phase shifter, to the output beam 84 respectively.

The 5th line from the top of the output power divider (PD), connected to the output of the power amplifier 1, is connected, through a phase shifter, to the output beam 85. The 5th line from the top of the output power divider (PD), connected to the output of the power amplifier 2, is connected, through a phase shifter, to the output beam 85. Similarly, each 5th line from the top of each power divider (PD), connected to the output of each power amplifier 3 through to 16, is connected, each through a different phase shifter, to the output beam 85 respectively.

The 6th line from the top of the output power divider, connected to the output of the power amplifier 1, is connected, through a phase shifter, to the output beam 86. The 6th line from the top of the output power divider, connected to the output of the power amplifier 2, is connected, through a phase shifter, to the output beam 86. Similarly, each 6th line from the top of each power divider, connected to the output of each power amplifier 3 thorugh to 16, is connected, each through a different phase shifter, to the output beam 86 respectively.

The 7th line from the top of the output power divider (PD), connected to the output of the power amplifier 1, is connected, through a phase shifter, to the output beam 87. The 7th line from the top of the output power divider (PD), connected to the output of the power amplifier 2, is connected, through a phase shifter, to the output beam 87. Similarly, each 7th line from the top of each power divider (PD), connected to the output of each power amplifier 3 through to 16, is connected, each through a different phase shifter, to the output beam 87 respectively.

The 8th line from the top of the output power divider (PD), connected to the output of the power amplifier 1, is connected, through a phase shifter, to the output beam 88. The 8th line from the top of the output power divider (PD), connected to the output of the power amplifier 2, is connected, through a phase shifter, to the output beam 88. Similarly, each 8th line from the top of each output power divider (PD), connected to the output of each power amplifier 3 through to 16, is connected, each through a different phase shifter, to the output beam 88 respectively.

The 9th line from the top of the output power divider (PD), connected to the output of the power amplifier 1, is connected, through a phase shifter, to the output beam 89. The 9th line from the top of the output power divider (PD), connected to the output of the power amplifier 2, is connected, through a phase shifter, to the output beam 89. Similarly, each 9th line from the top of each output power divider (PD), connected to the output of each power amplifier 3 through to 16, is connected, each through a different phase shifter, to the output beam 89 respectively.

The 10th line from the top of the output power divider (PD), connected to the output of the power amplifier 1, is connected, through a phase shifter, to the output beam 90. The 10th line from the top of the output power divider (PD), connected to the output of the power amplifier 2, is connected, through a phase shifter, to the output beam 90. Similarly, each 10th line from the top of each output power divider (PD), connected to the output of each power amplifier 3 through to 16, is connected, each through a different phase shifter, to the output beam 90.

The 11th line from the top of the output power divider (PD), connected to the output of the power amplifier 1, is connected, through a phase shifter, to the output beam 91. The 11th line from the top of the output power divider (PD), connected to the output of the power amplifier 2, is connected, through a phase shifter, to the output beam 91. Similarly, each 11th line from the top of each output power divider (PD), connected to the output of each power amplifier 3 through to 16, is connected, each through a different phase shifter, to the output beam 91.

The 12th line from the top of the output power divider (PD), connected to the output of the power amplifier 1, is connected, through a phase shifter, to the output beam 92. The 12th line from the top of the output power divider (PD), connected to the output of the power amplifier 2, is connected, through a phase shifter, to the output beam 92. Similarly, each 12th line from the top of each output power divider (PD), connected to the output of each power amplifier 3 through to 16, is connected, each through a different phase shifter, to the output beam 92.

The 13th line from the top of the output power divider (PD), connected to the output of the power amplifier 1, is connected, through a phase shifter, to the output beam 93. The 13th line from the top of the output power divider (PD), connected to the output of the power amplifier 2, is connected, through a phase shifter, to the output beam 93. Similarly, each 13th line from the top of each output power divider (PD), connected to the output of each power amplifier 3 through to 16, is connected, each through a different phase shifter, to the output beam 93.

The 14th line from the top of the output power divider (PD), connected to the output of the power amplifier 1, is connected, through a phase shifter, to the output beam 94. The 14th line from the top of the output power divider (PD), connected to the output of the power amplifier 2, is connected, through a phase shifter, to the output beam 94. Similarly, each 14th line from the top of each output power divider (PD), connected to the output of each power amplifier 3 through to 16, is connected, each through a different phase shifter, to the output beam 94.

The 15th line from the top of the output power divider (PD), connected to the output of the power amplifier 1, is connected, through a phase shifter, to the output beam 95. The 15th line from the top of the output power divider (PD), connected to the output of the power amplifier 2, is connected, through a phase shifter, to the output beam 95. Similarly, each 15th line from the top of each output power divider (PD), connected to the output of each power amplifier 3 through to 16, is connected, each through a different phase shifter, to the output beam 95.

The 16th line from the top of the output power divider (PD), connected to the output of the power amplifier 1, is connected, through a phase shifter, to the output beam 96. The 16th line from the top of the output power divider (PD), connected to the output of the power amplifier 2, is connected, through a phase shifter, to the output beam 96. Similarly, each 16th line from the top of each output power divider (PD), connected to the output of each power amplifier 3 through to 16, is connected, each through a different phase shifter, to the output beam 96.

The signals arriving at the feed elements for the output beam 81, corresponding to the input beam 61, arrive in phase and add together. The signals arriving at the feed elements for the output beam 81, corresponding to the input beam 62, arrive in antiphase and they cancel one another. The signals arriving at the feed elements for the output beam 81, corresponding to the input beam 63, arrive in antiphase and they cancel one another. Similarly, signals arriving at the feed elements for the output beam 81, corresponding to each input beam 64 through 76, arrive in antiphase and they cancel one another. The feed elements of the output beam 81 carry signal of only input beam 61 and signals of each input beam 62 through 76 are cancelled. Each output beam carries signal of its input beam only.

There is a flexibility in positioning the output beams in relation to the corresponding input beams. For example, the output line from each 1st line of the output power divider, each connected to each power amplifier 1 through 16, is connected, each through a different phase shifter, to the output beam 81. All these signals, from power amplifier 1 through 16, after each phase shifter, travel through equal length of lines arriving at the output beam 81. These equal length lines can terminate opposite input beam 76 or they can end opposite to input beam position 61, as shown in FIG. 2, or anywhere in between them. There is a complete flexibility in positioning the output beam in relation to its input beam.

Figure 3:
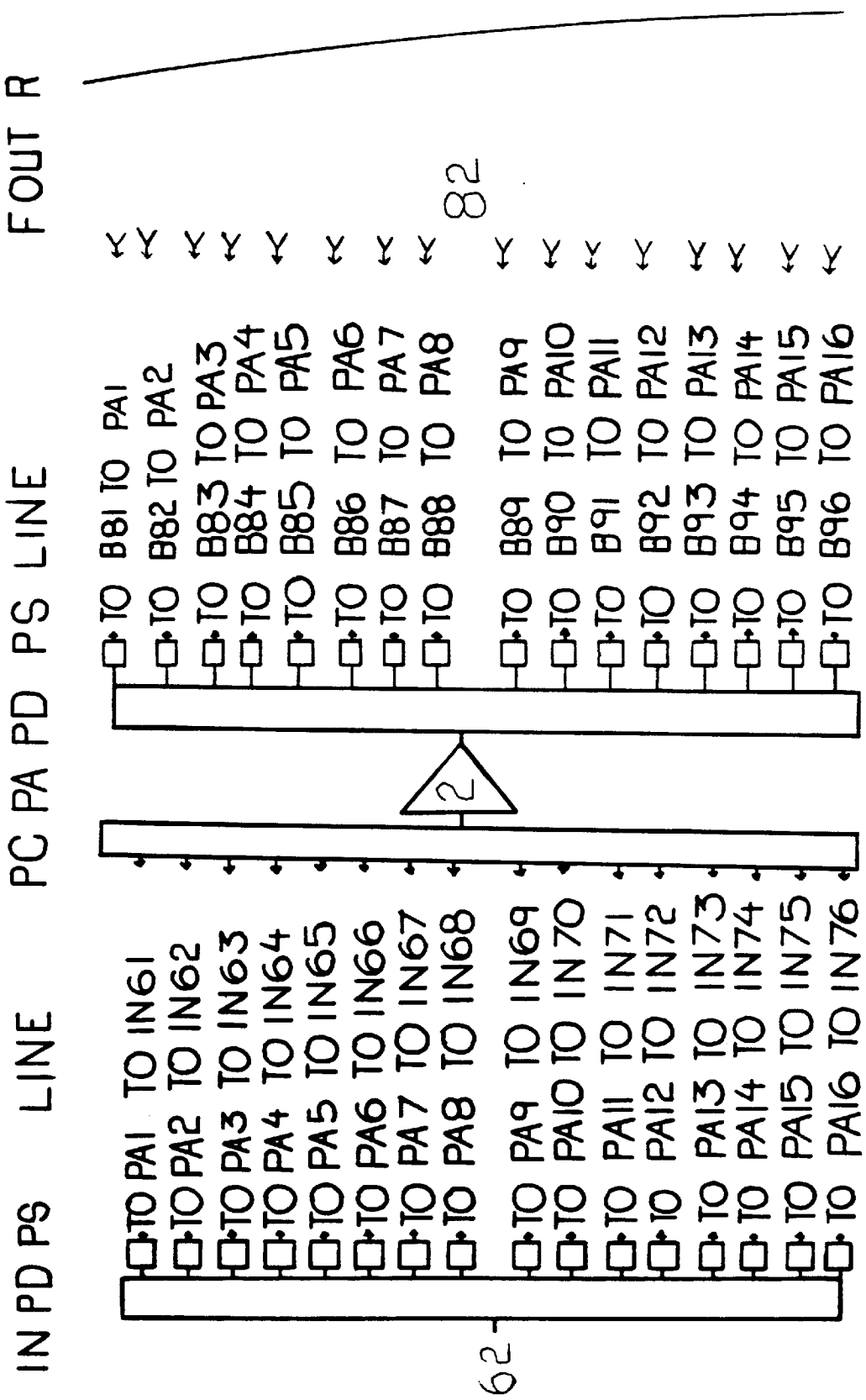
FIG. 3 is another portion of a schematic diagram of a typical 16 beam embodiment of this invention including an input beam 62, a power amplifier 2 and an output beam 82.
Figure 4:
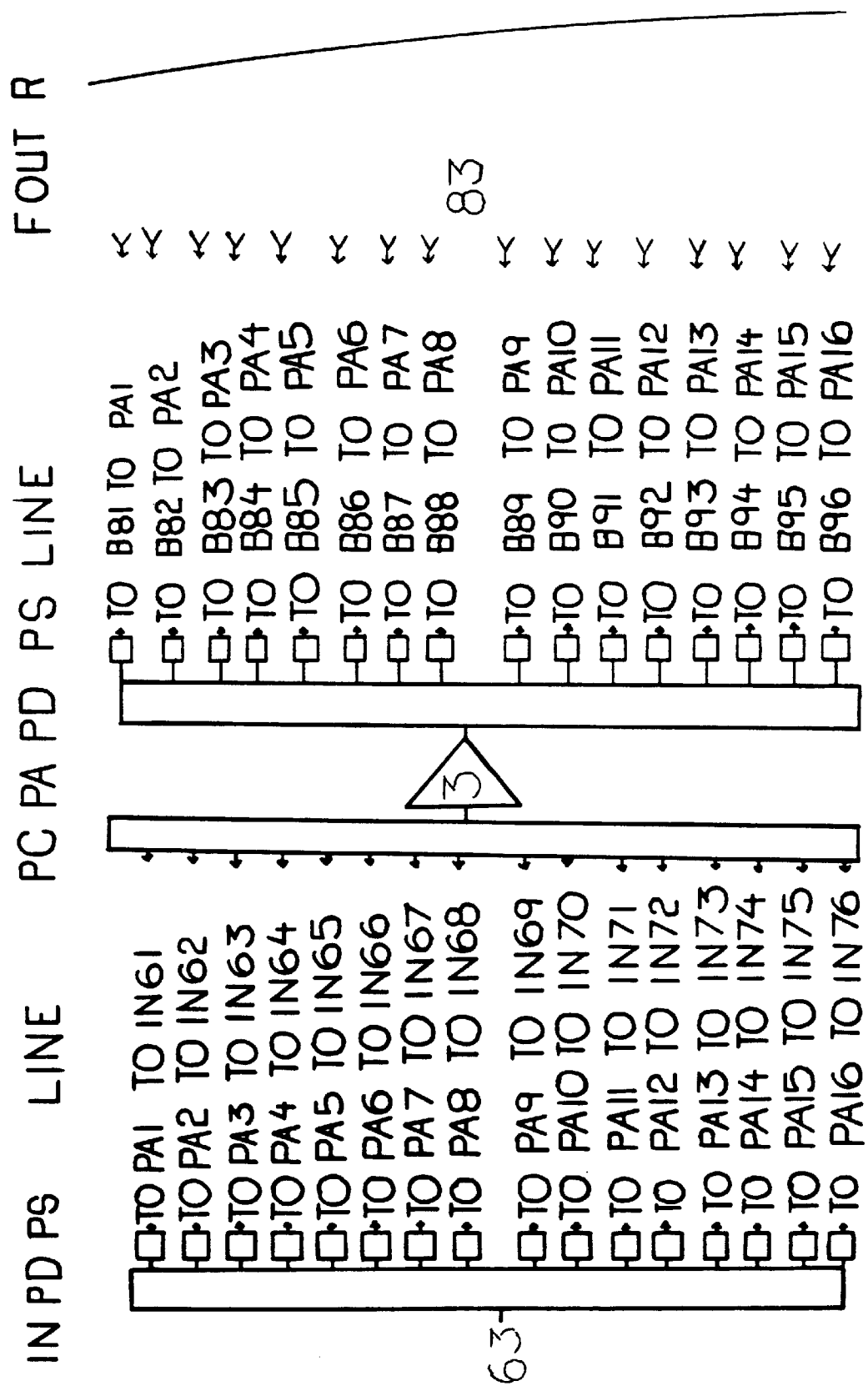
FIG. 4 is a portion of a schematic diagram of a typical 16 beam embodiment of this invention including an input beam 63, a power amplifier 3 and an output beam 83.
Figure 5:
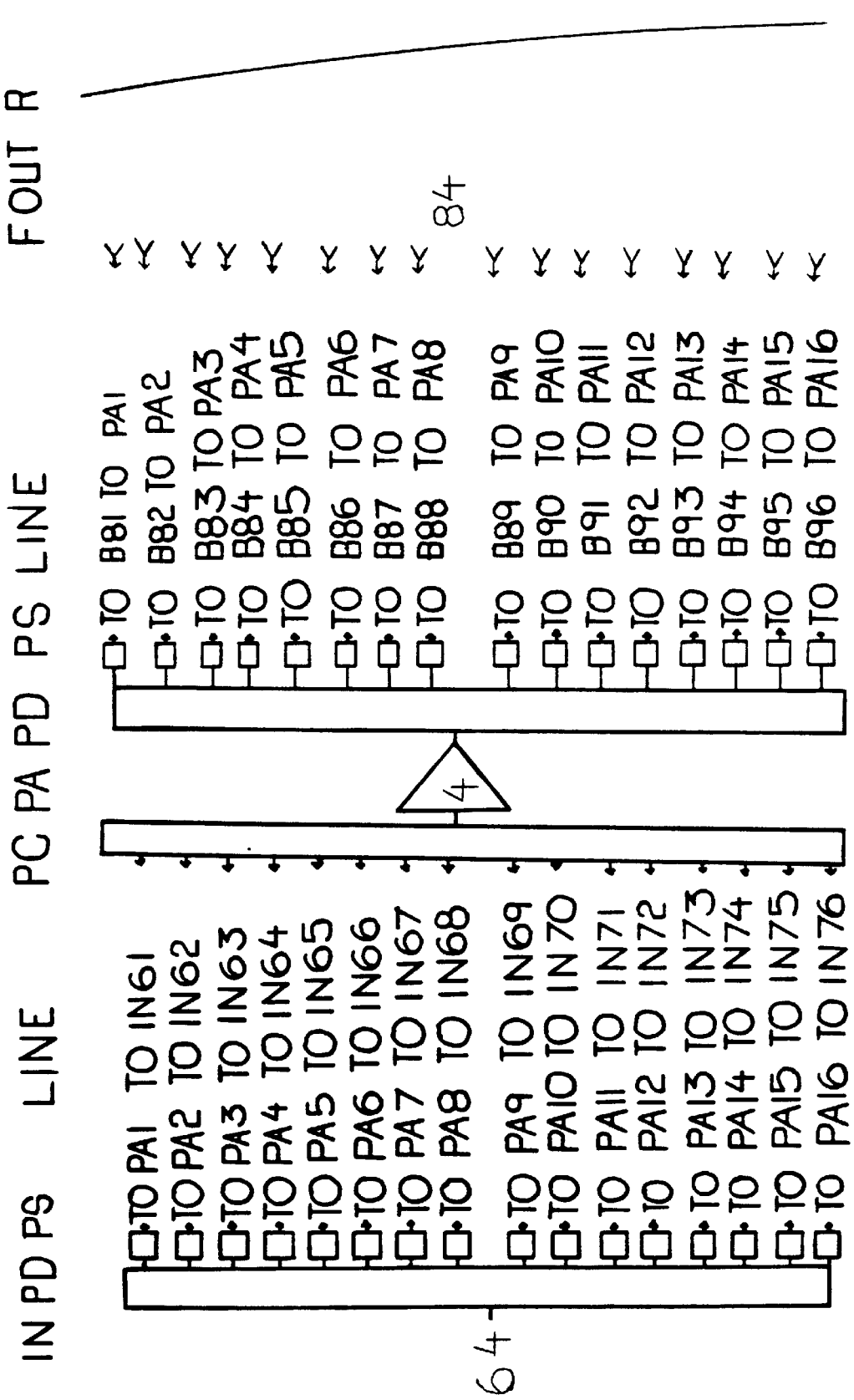
FIG. 5 is a portion of a schematic diagram of a typical 16 beam embodiment of this invention including an input beam 64, a power amplifier 4 and an output beam 84.
Figure 6:
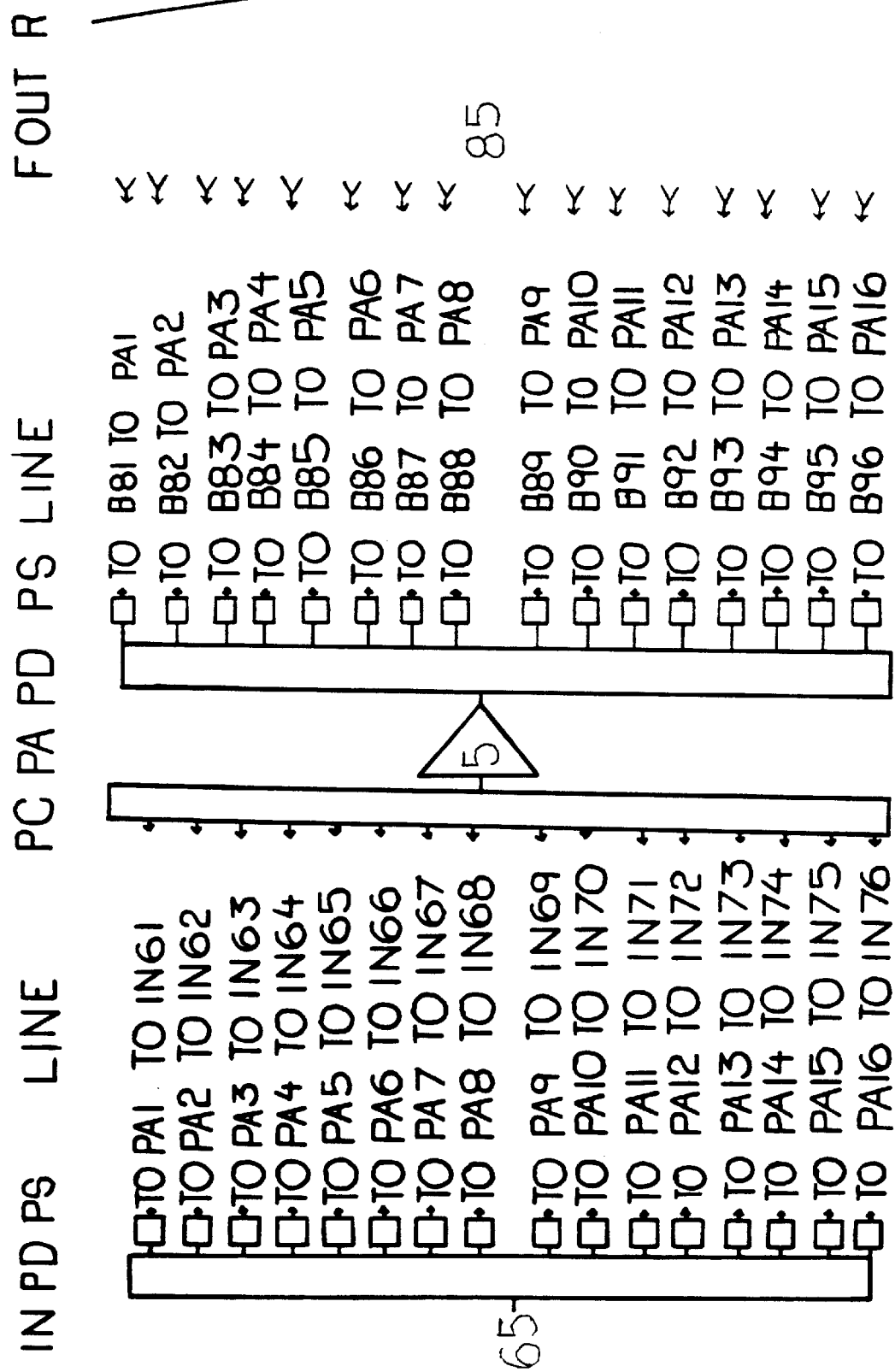
FIG. 6 is a portion of a schematic diagram of a typical 16 beam embodiment of this invention including an input beam 65, a power amplifier 5 and an output beam 85.
Figure 7:
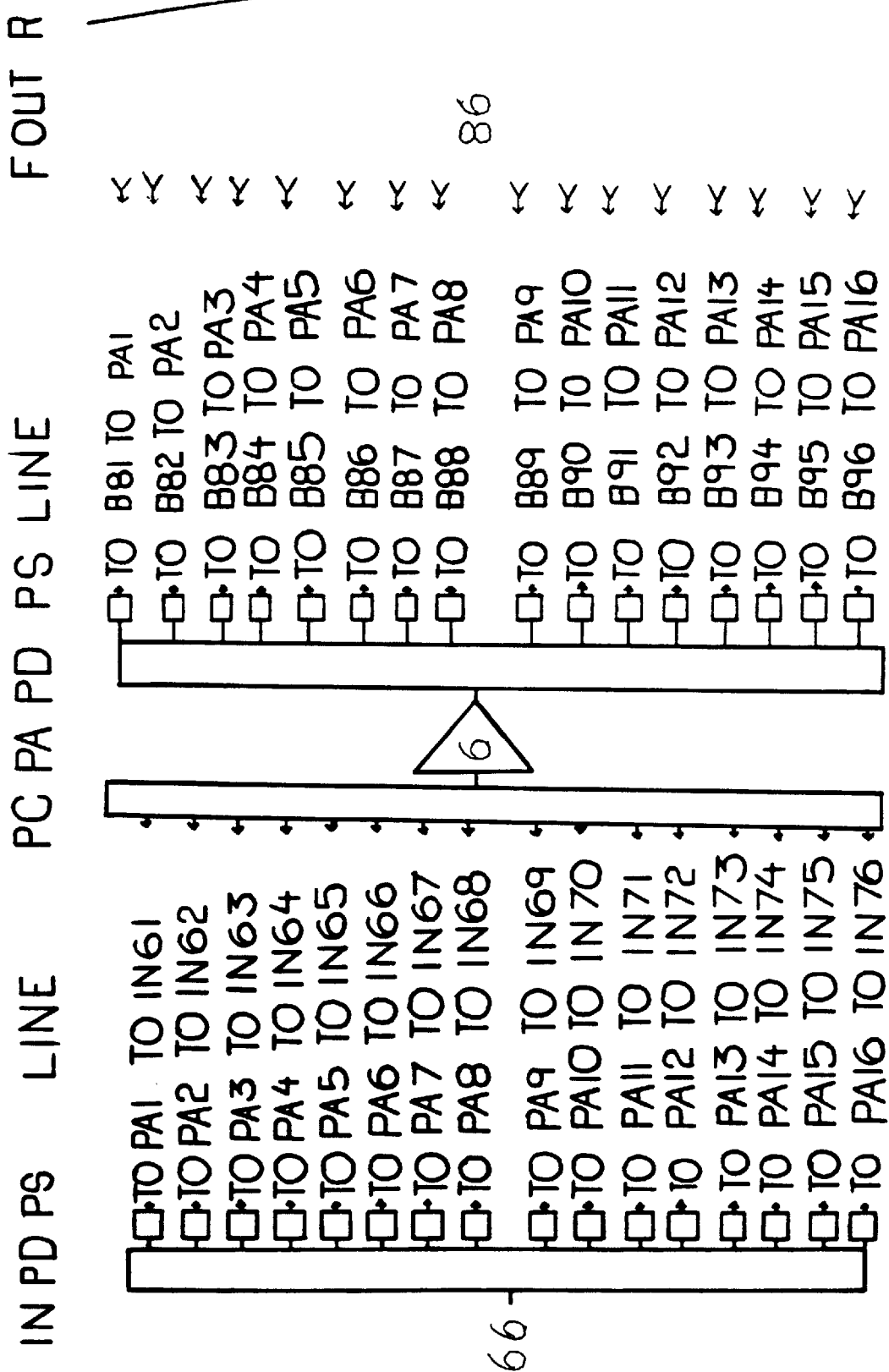
FIG. 7 is a portion of a schematic diagram of a typical 16 beam embodiment of this invention including an input beam 66, a power amplifier 6 and an output beam 86.
Figure 8:
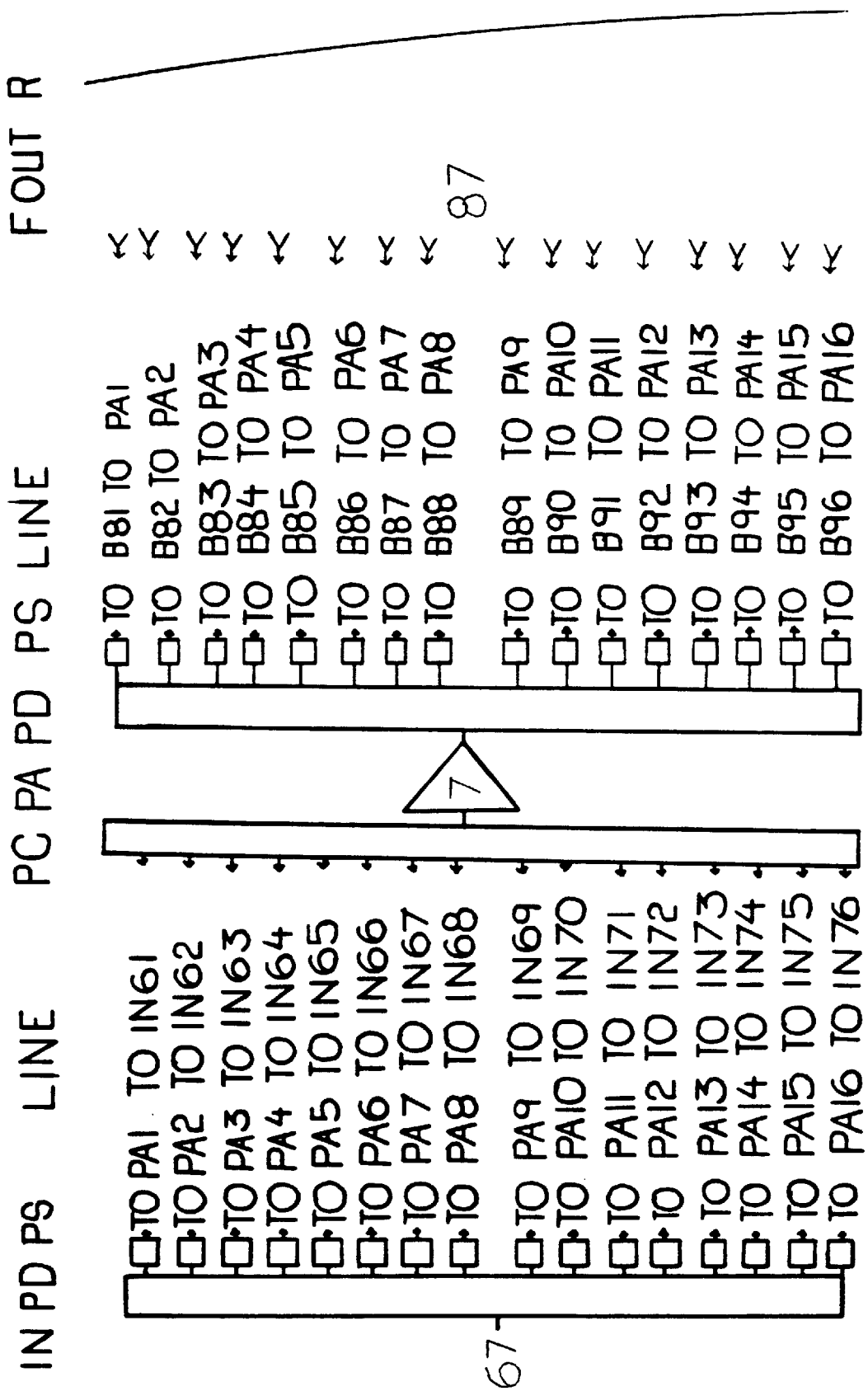
FIG. 8 is a portion of a schematic diagram of a typical 16 beam embodiment of this invention including an input beam 67, a power amplifier 7 and an output beam 87.
Figure 9:
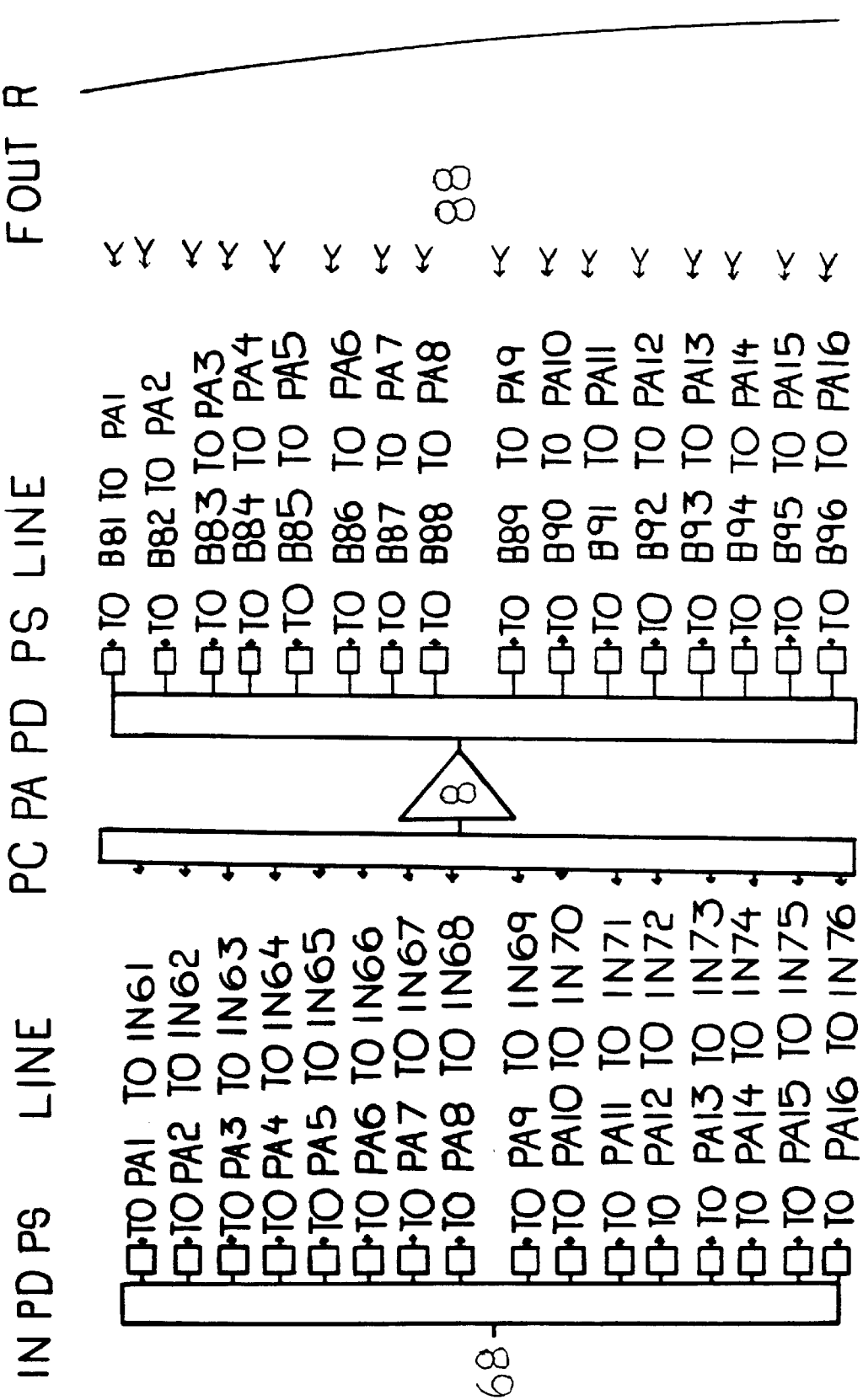
FIG. 9 is a portion of a schematic diagram of a typical 16 beam embodiment of this invention including an input beam 68, a power amplifier 8 and an output beam 88.
Figure 10:
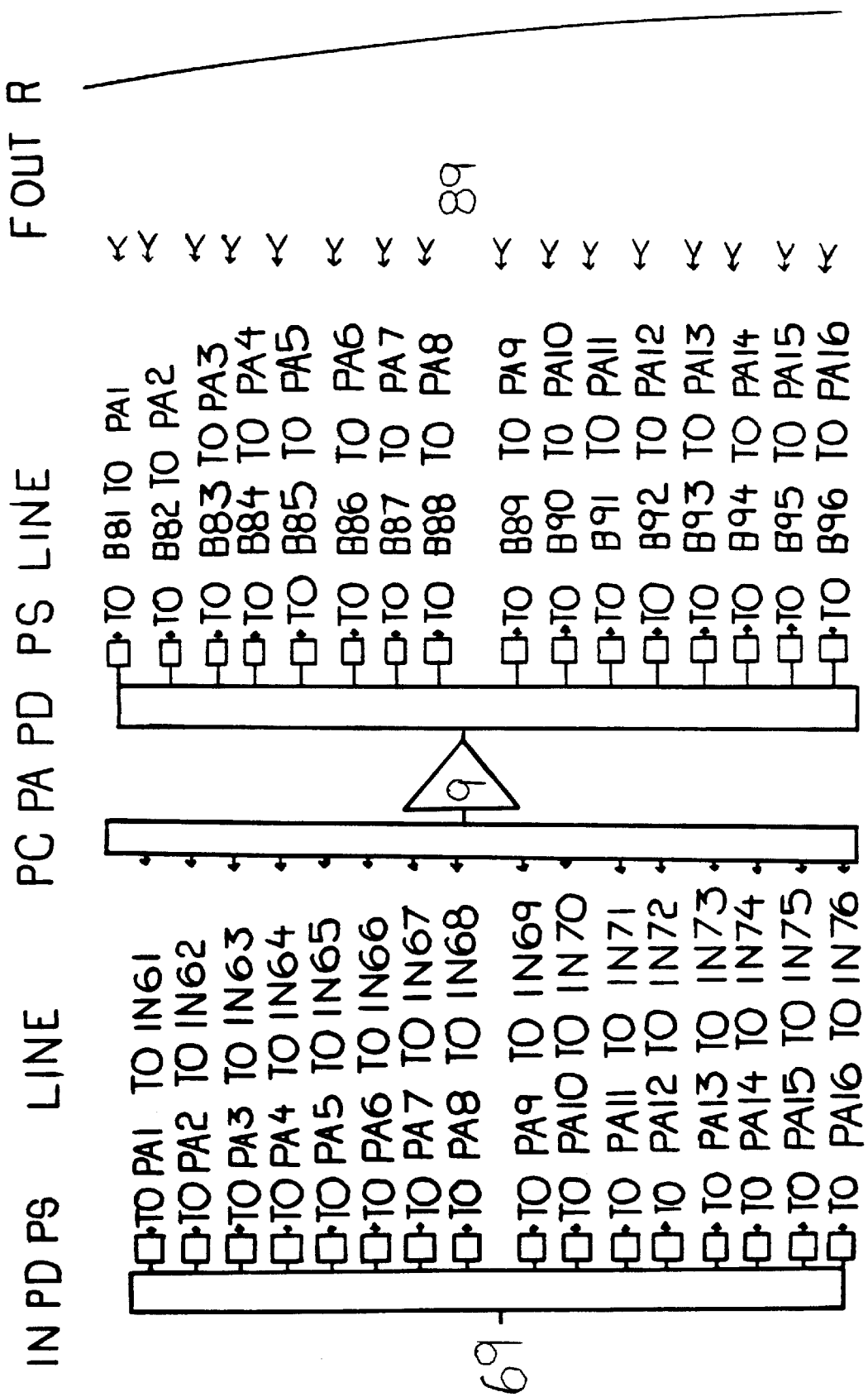
FIG. 10 is a portion of a schematic diagram of a typical 16 beam embodiment of this invention including an input beam 69, a power amplifier 9 and an output beam 89.
Figure 11:
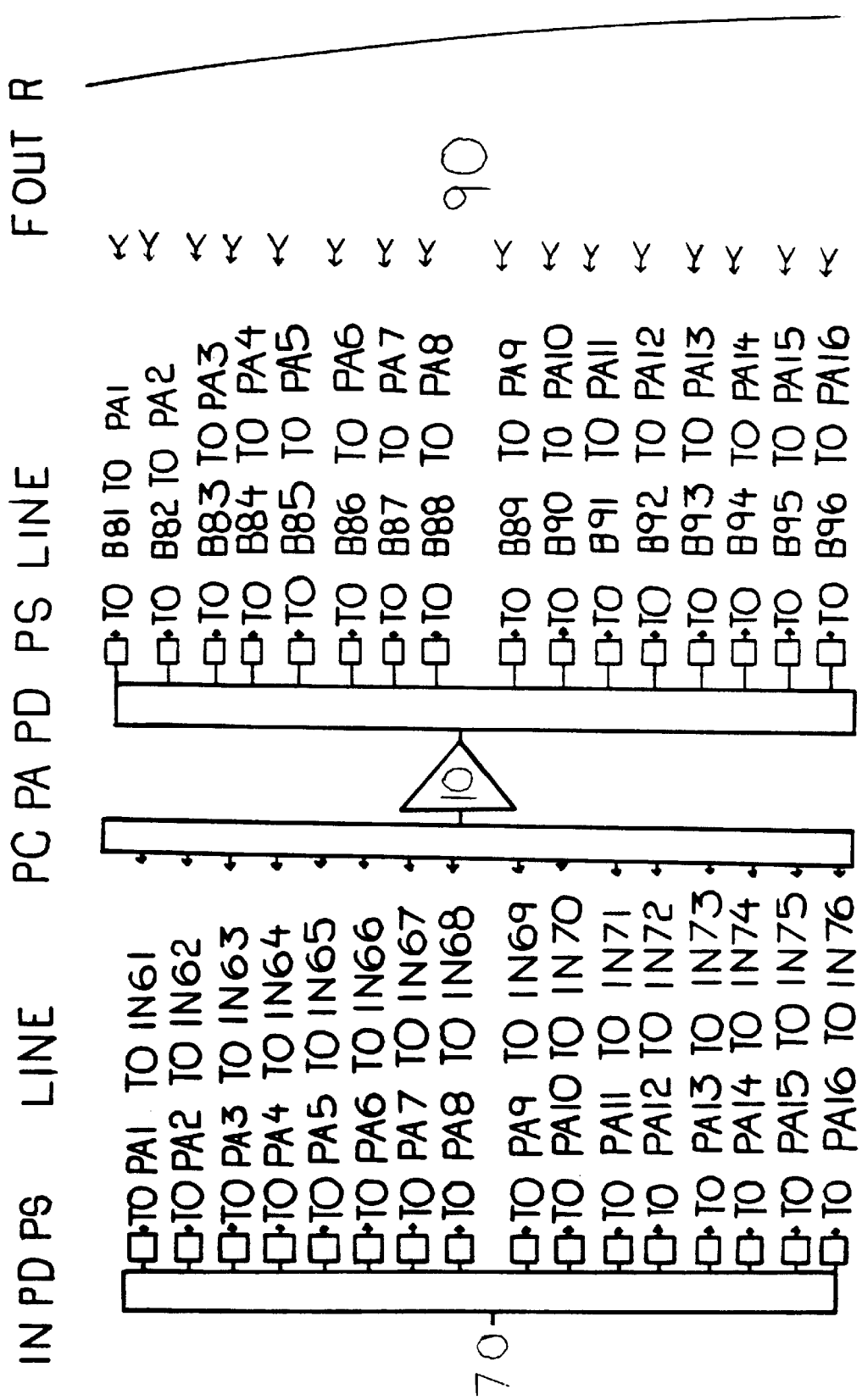
FIG. 11 is a portion of a schematic diagram of a typical 16 beam embodiment of this invention including an input beam 70, a power amplifier 10 and an output beam 90.
Figure 12:
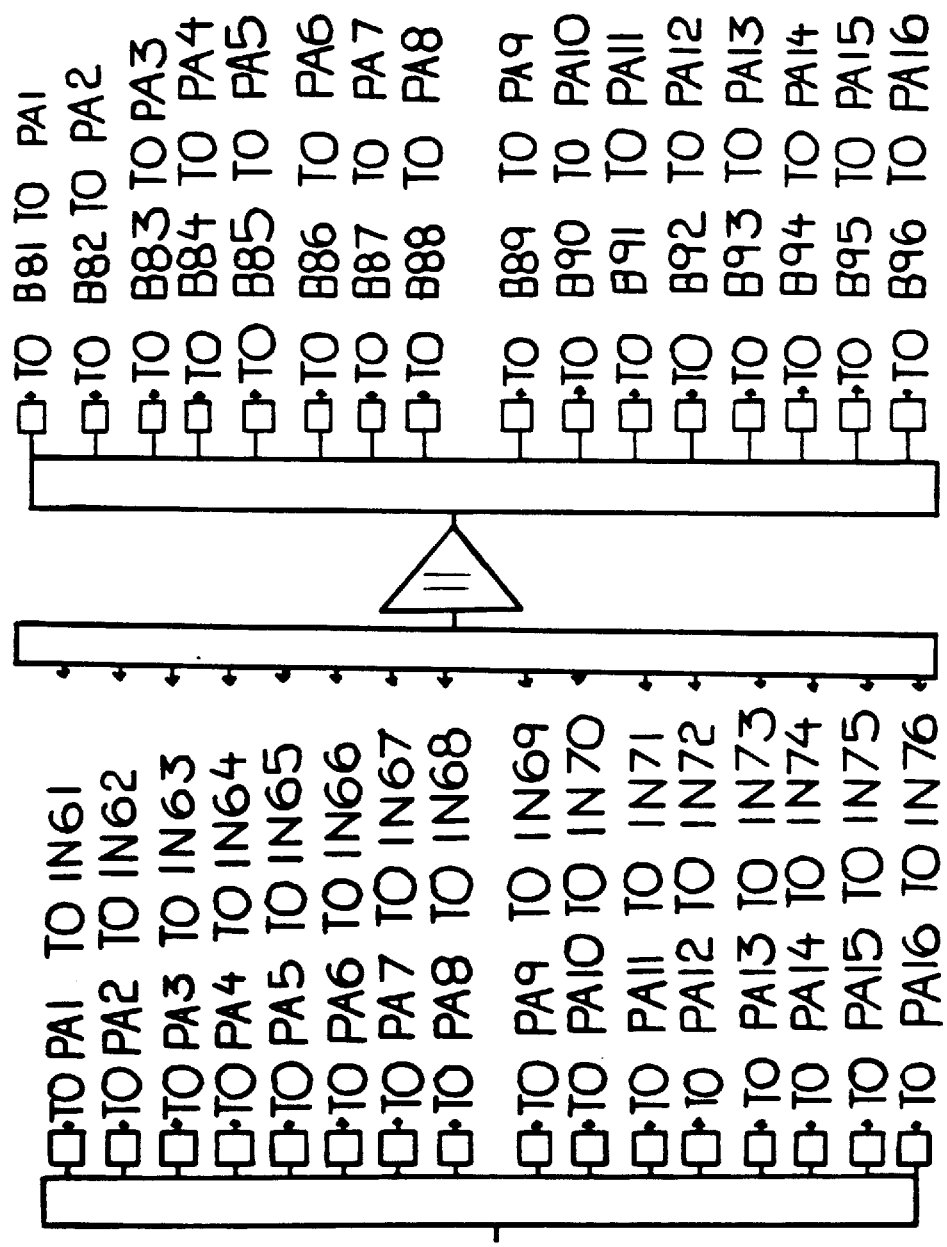
FIG. 12 is a portion of a schematic diagram of a typical 16 beam embodiment of this invention including an input beam 71, a power amplifier 11 and an output beam 91.
Figure 13:
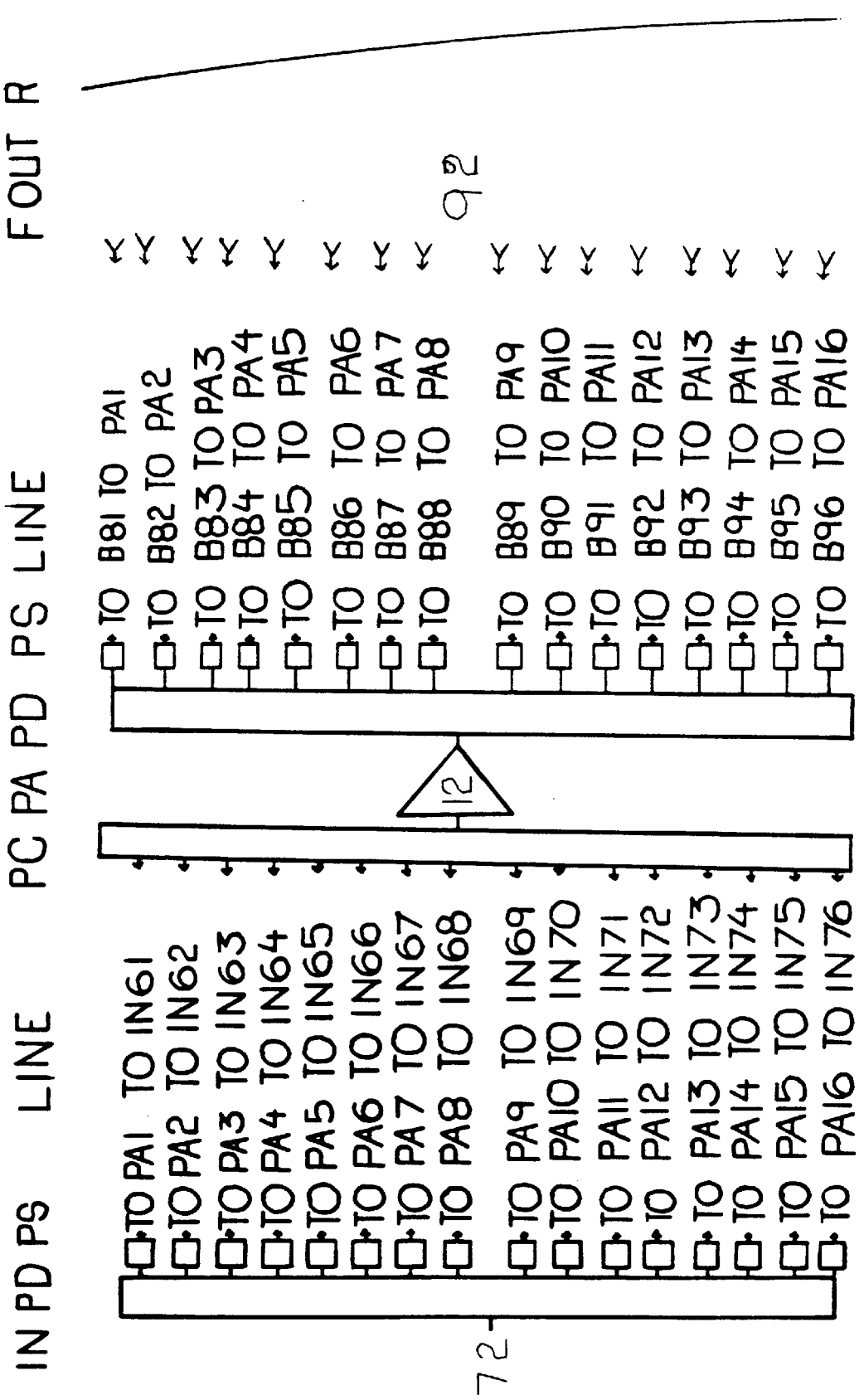
FIG. 13 is a portion of a schematic diagram of a typical 16 beam embodiment of this invention including an input beam 72, a power amplifier 12 and an output beam 92.
Figure 14:
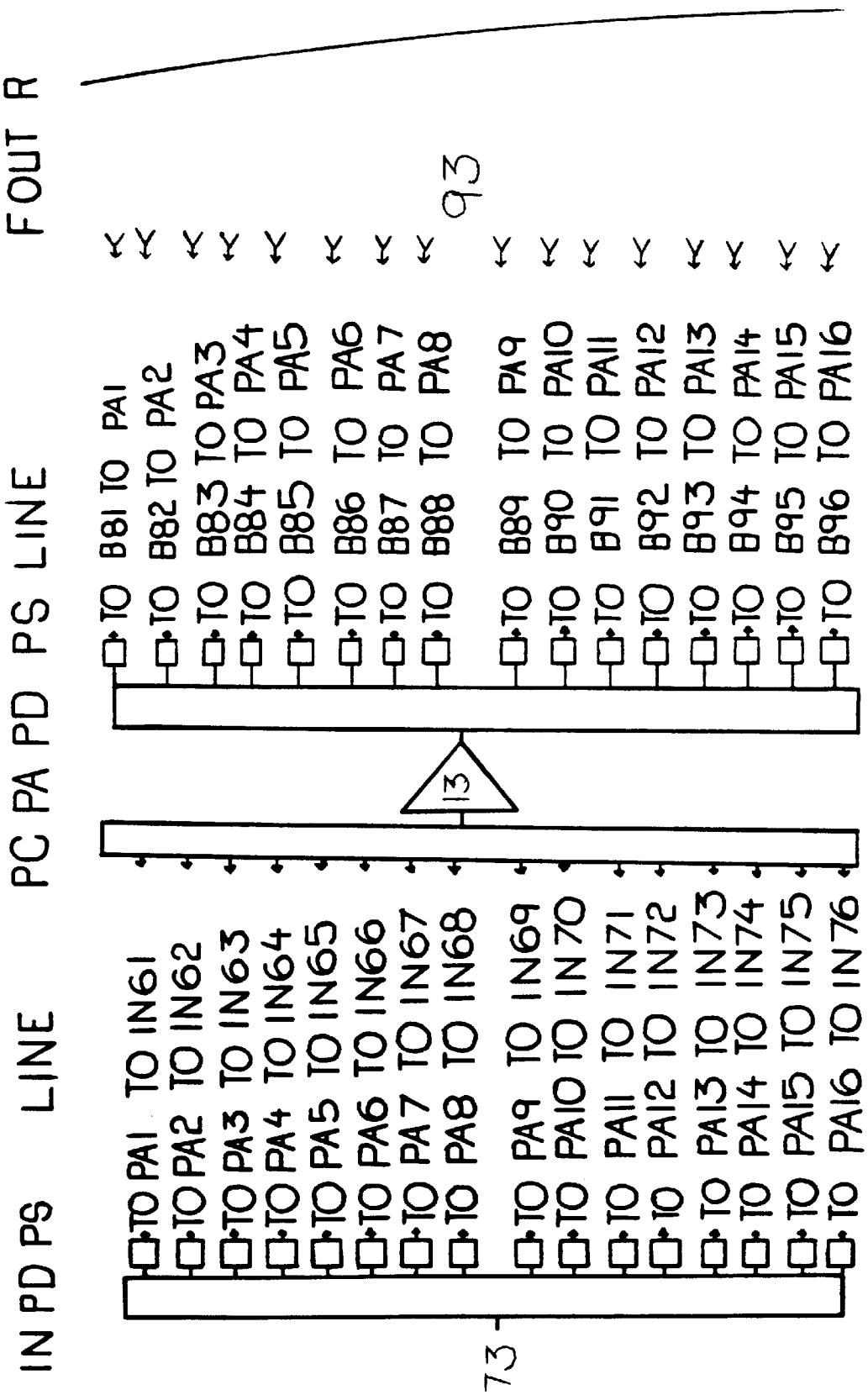
FIG. 14 is a portion of a schematic diagram of a typical 16 beam embodiment of this invention including an input beam 73, a power amplifier 13 and an output beam 93.

The output beam for each 2nd line of the output power divider, each connected to power amplifier 1 through 16, is connected, each through a different phase shifter, to the output beam 82. All these signals, from power amplifer 1 through 16, after each phase shifter, travel through equal length lines arriving at output beam 82. These equal length lines can end opposite to input beam 75, as shown in FIG. 3, or they can end oppsite to input beam 62 or anywhere in between them.

Similarly, each output beam 83 through 96, corresponding respectively to in-phase signals of beams 63 through 76, can be connected as shown or each output beam can be positioned opposite to its input beam or anywhere in between them. There is a complete flexibility in positioning the output beam in relation to its input beam.

Typical examples of 4 and 16 beam system are shown in figures. The same design is applicable to systems having 1 through n beams.

Figure 18:
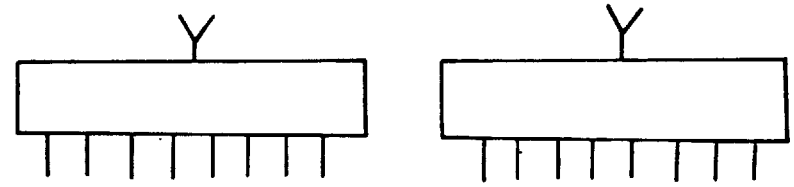
FIG. 18 is a schematic diagram showing a method of reducing the number of feed elements by sub sets or sub clustering.

It may be necessary to reduce the feed elements for a number of reasons. One of them being the availability of physical space. One embodiment using sub set or sub cluster is shown in FIG. 18. Here 8 input lines are combined and the output is one feed line. For 16 output lines, only two feed elements are shown. The sub set could be made of four lines, providing altogether 4 feed elements per beam for the 16 beam system.

Figure 19:
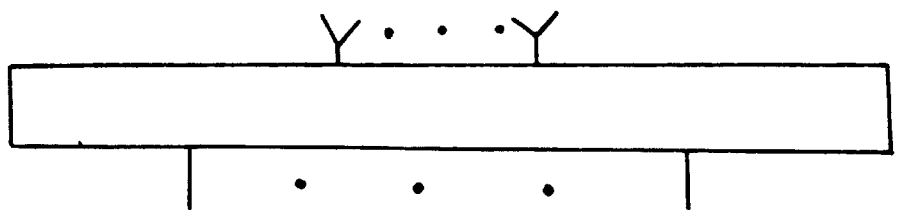
FIG. 19 is a schematic diagram showing a general method of reducing the number of feed elements.

Another embodiment is shown in FIG. 19 where the input is 1, 2 . . . n lines the output of which is combined. The output is 1, 2 . . . m lines where m is less than n. Signals of beams 62 through 76 are respectively in phase at beams 82 through 96.

Figure 20:
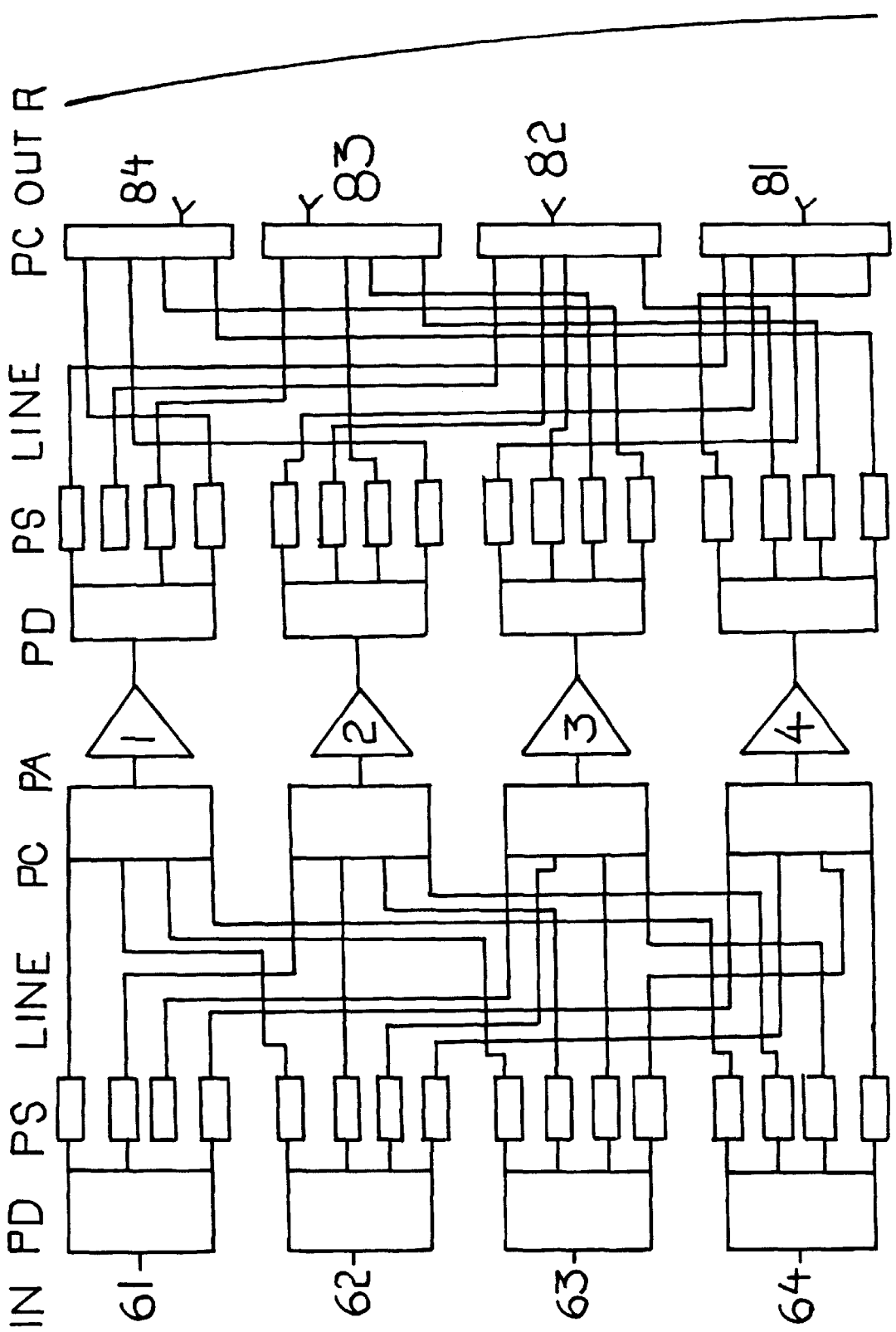
FIG. 20 is a schematic diagram of a typical 4 beam second embodiment of this invention.
Figure 21:
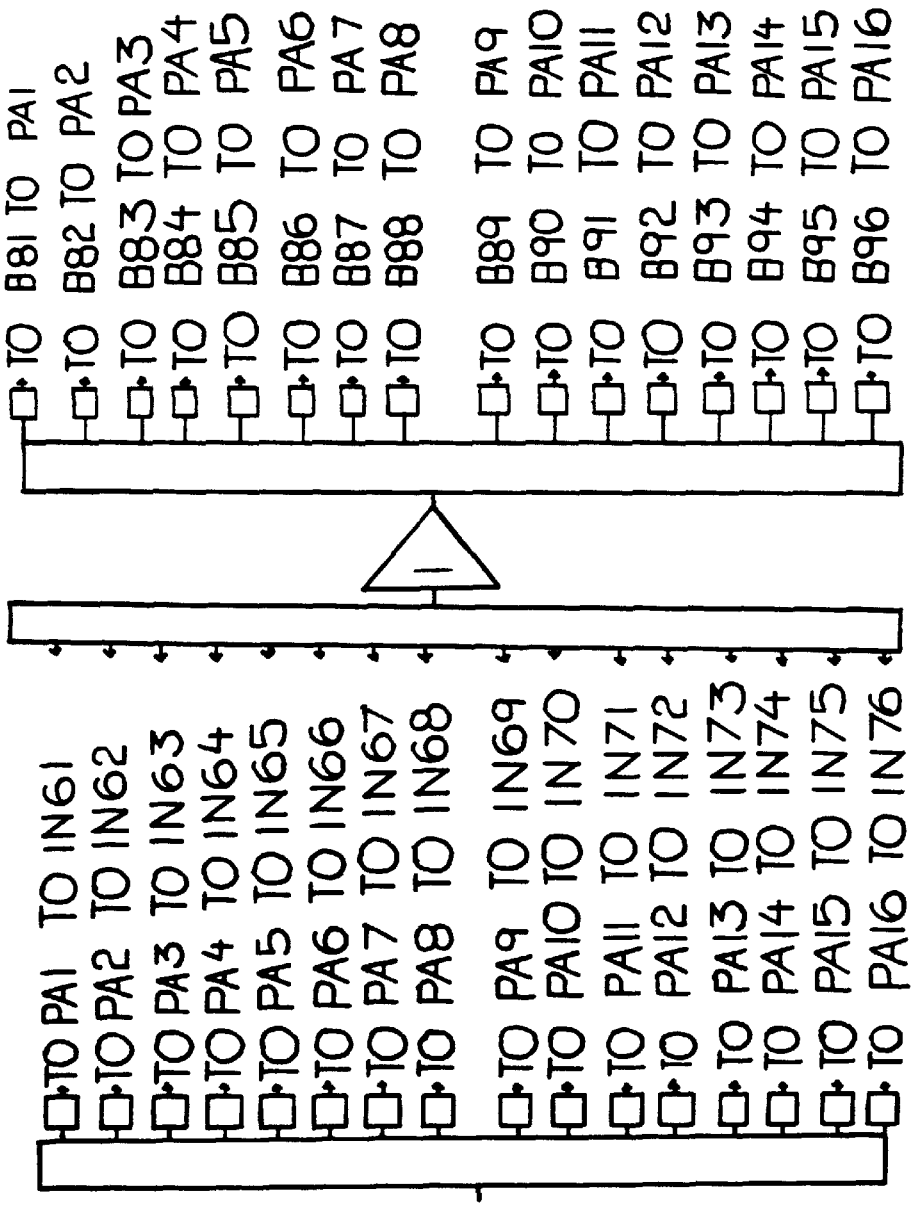
FIG. 21 is a portion of schematic diagram of a typical 16 beam second embodiment of this invention including an input beam 61, a power amplifier 1 and an output beam 81.
Figure 22:
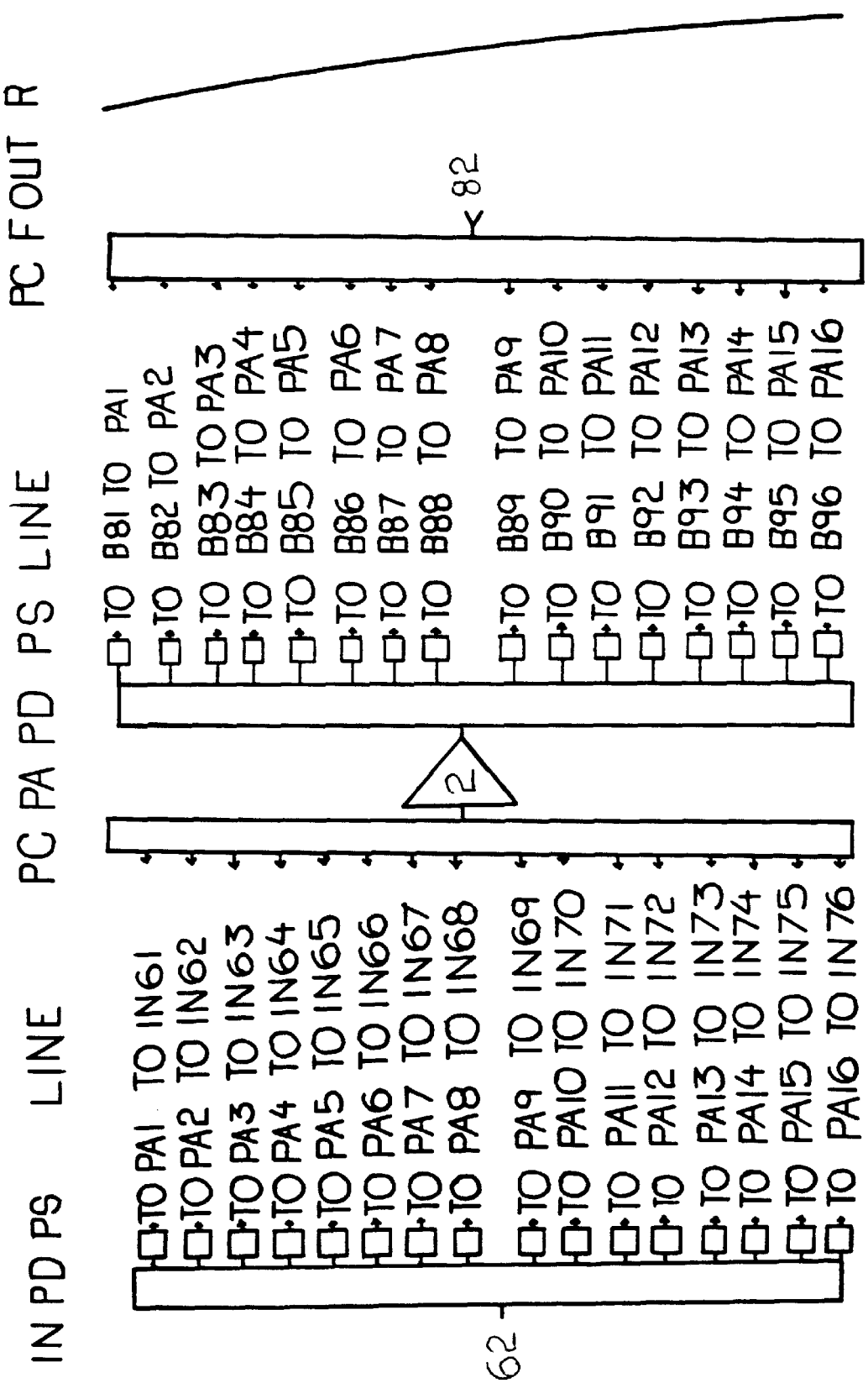
FIG. 22 is another portion of a schematic diagram of a typical 16 beam second embodiment of this invention including an input beam 62, a power amplifier 2 and an output beam 82.
Figure 23:
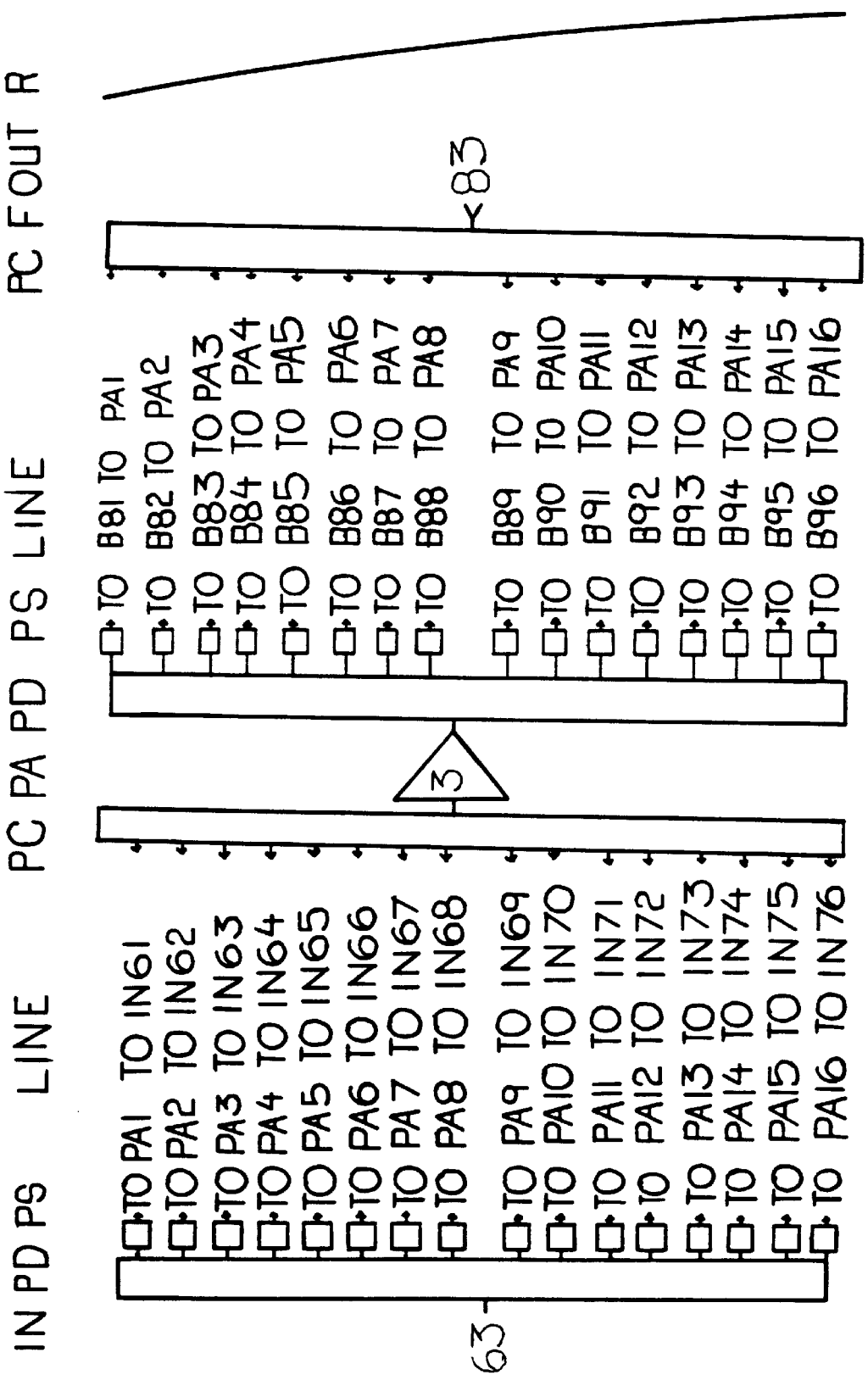
FIG. 23 is a portion of a schematic diagram of a typical 16 beam second embodiment of this invention including an input beam 63, a power amplifier 3 and an output beam 83.
Figure 24:
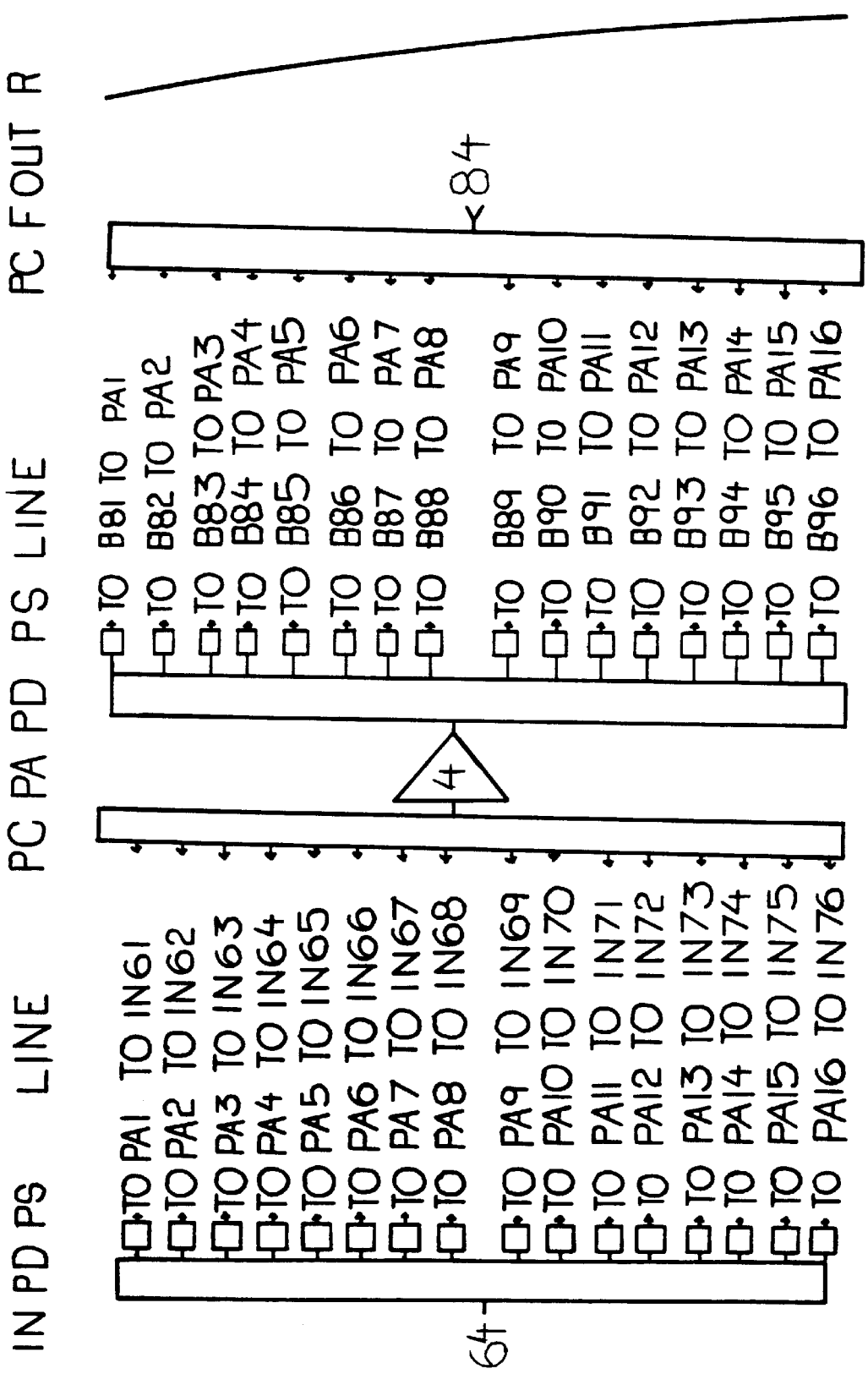
FIG. 24 is a portion of a schematic diagram of a typical 16 beam second embodiment of this invention including an input beam 64, a power amplifier 4 and an output beam 84.
Figure 25:
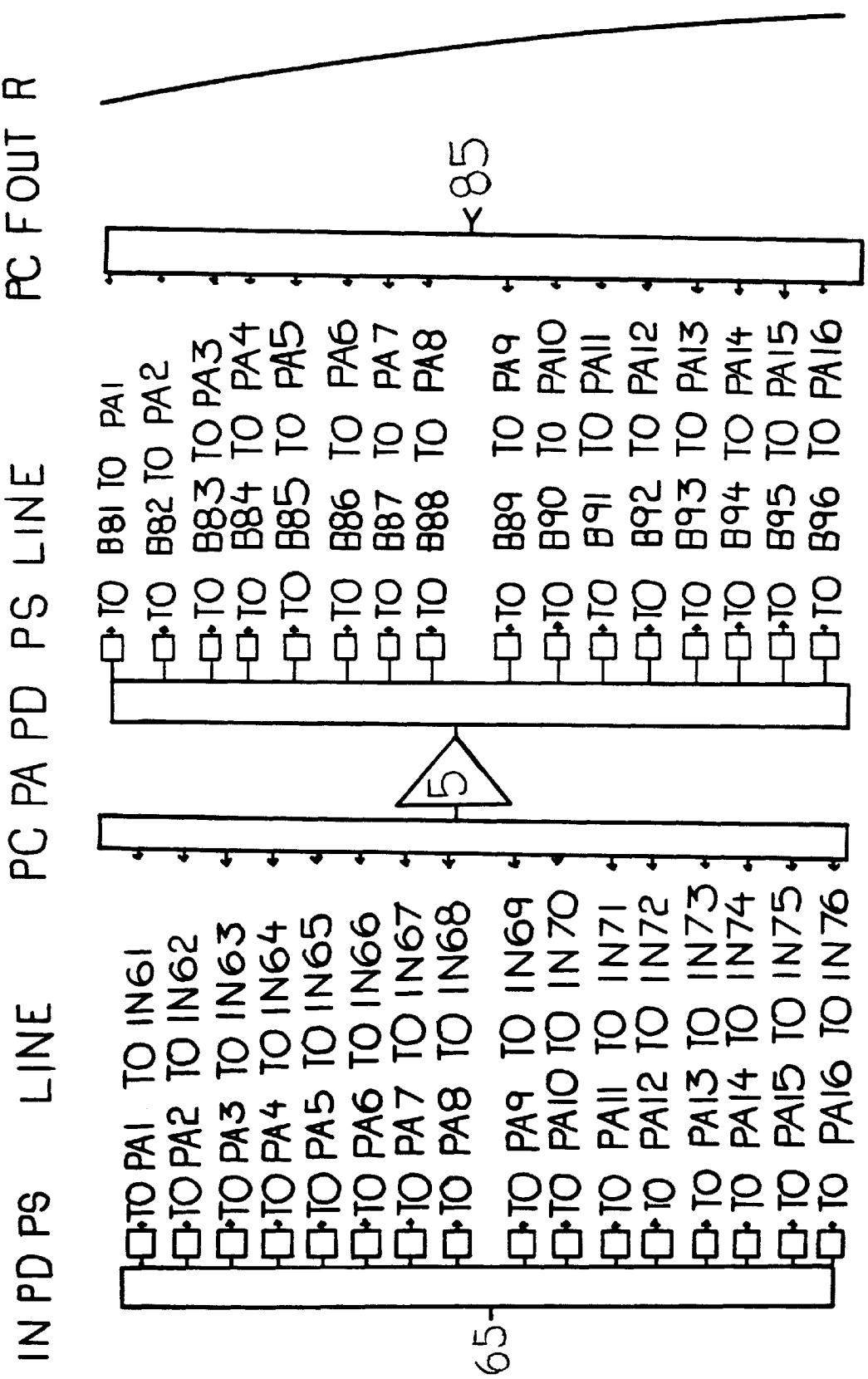
FIG. 25 is a portion of a schematic diagram of a typical 16 beam second embodiment of this invention including an input beam 65, a power amplifier 5 and an output beam 85.
Figure 26:
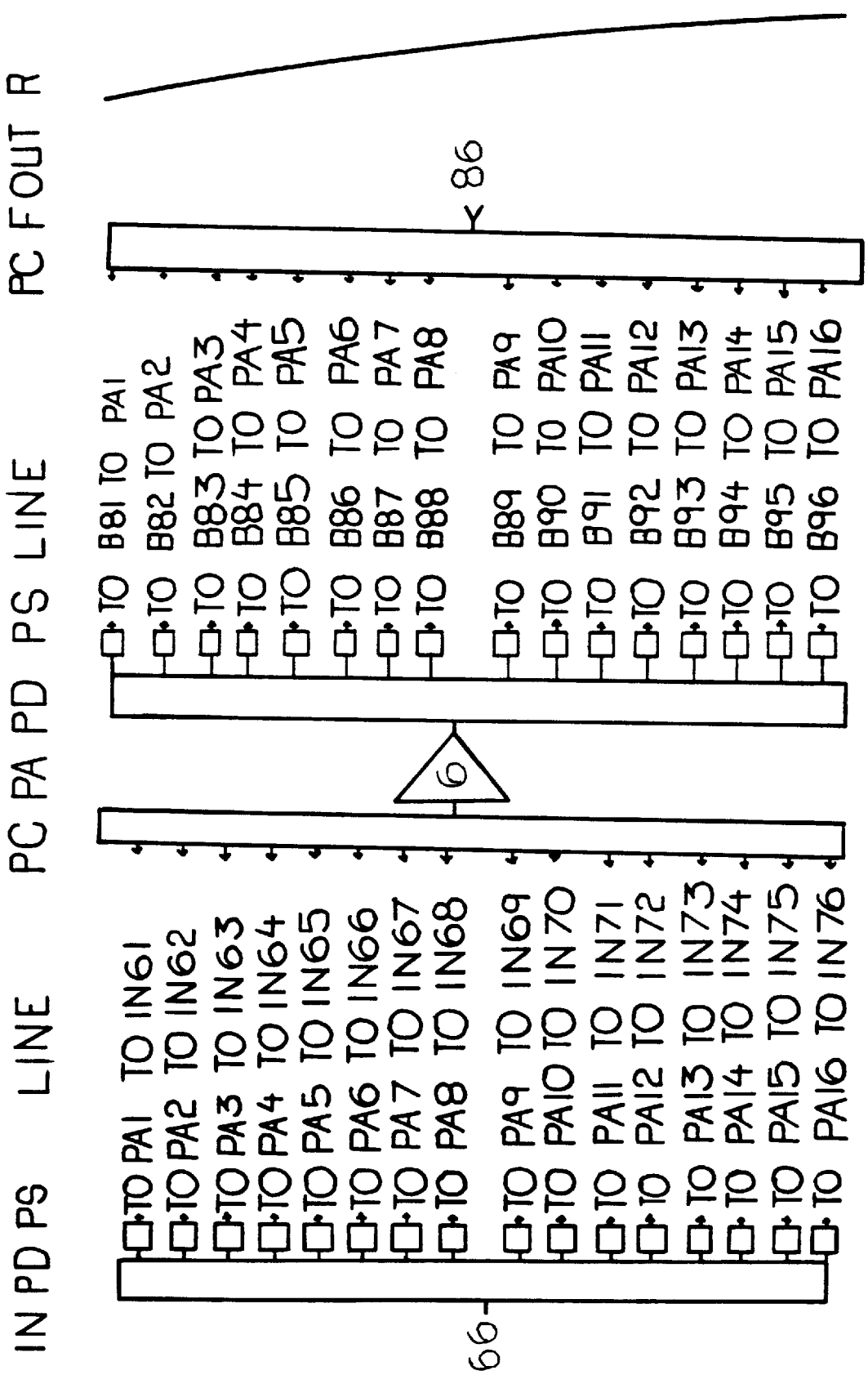
FIG. 26 is a portion of a schematic diagram of a typical 16 beam second embodiment of this invention including an input beam 66, a power amplifier 6 and an output beam 86.
Figure 27:
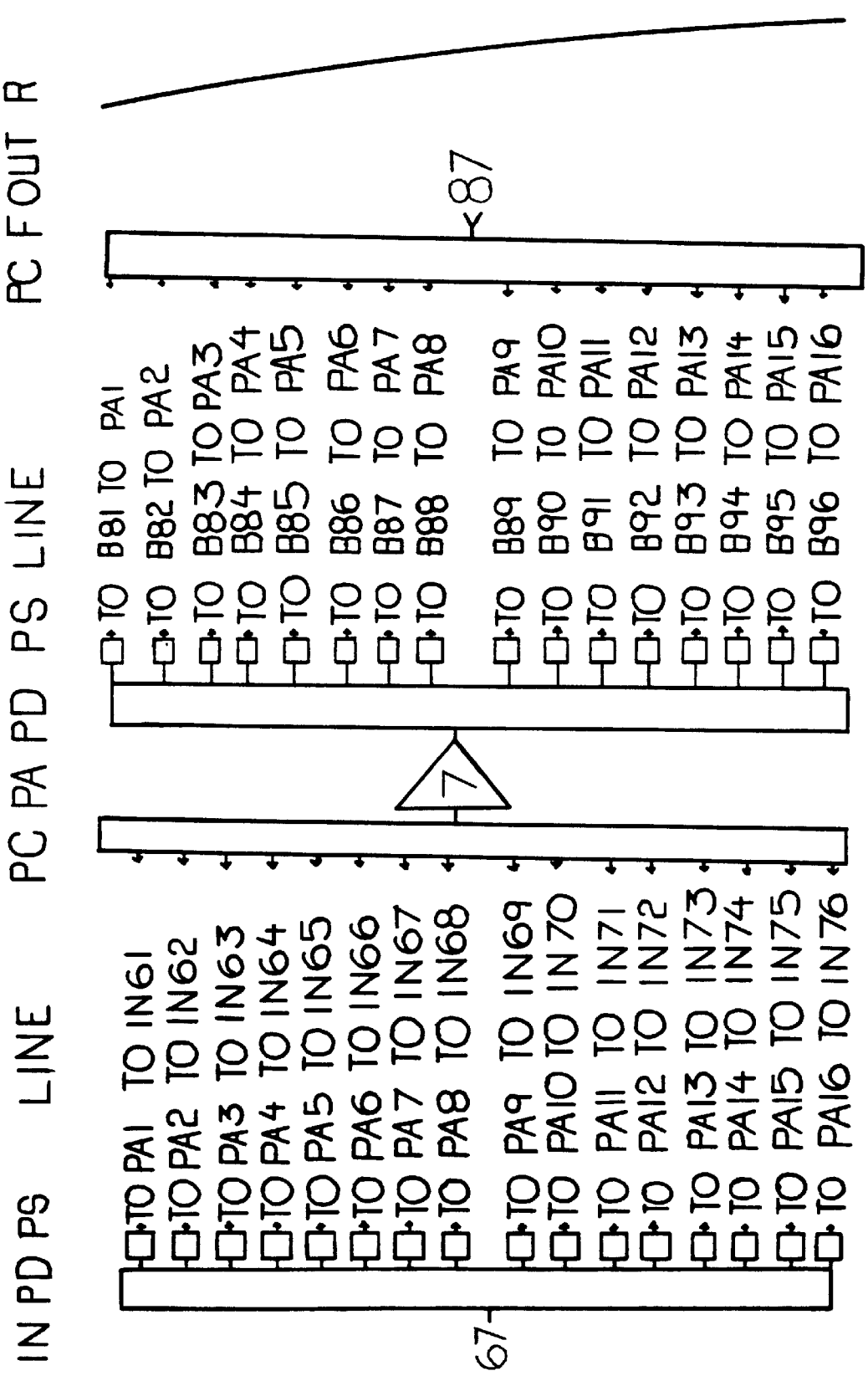
FIG. 27 is a portion of a schematic diagram of a typical 16 beam second embodiment of this invention including an input beam 6;7, a power amplifier 7 and an output beam 87.
Figure 28:
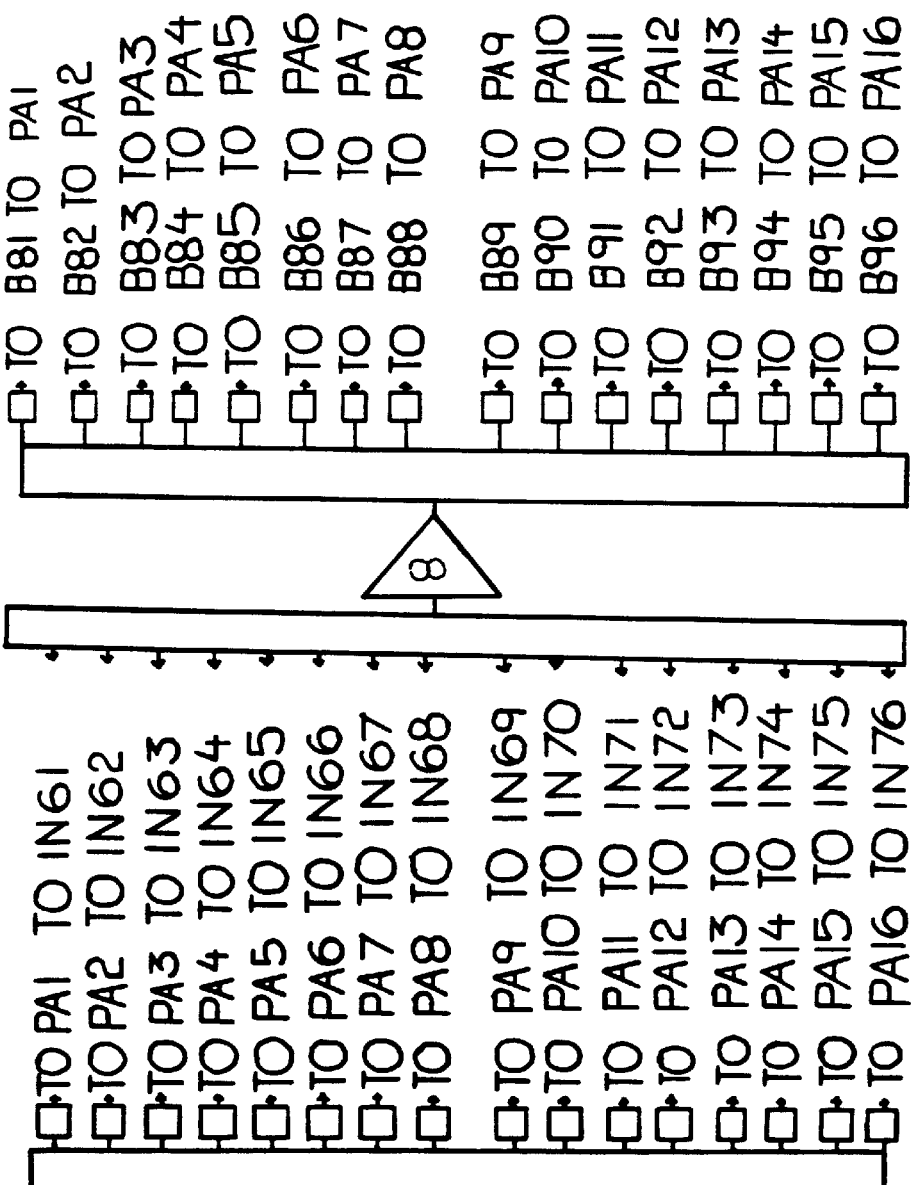
FIG. 28 is a portion of a schematic diagram of a typical 16 beam second embodiment of this invention including an input beam 68, a power amplifier 8 and an output beam 88.
Figure 29:
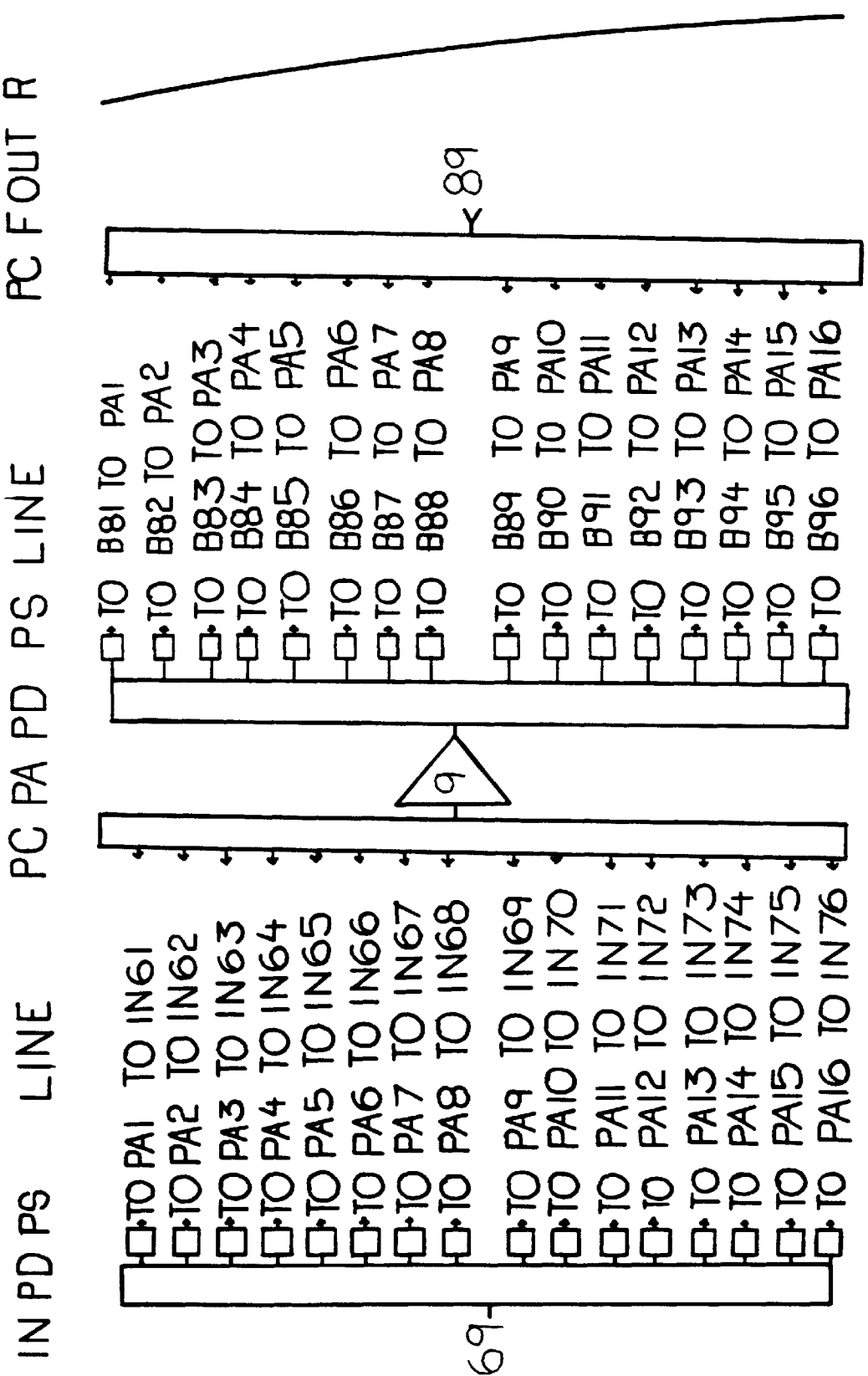
FIG. 29 is a portion of a schematic diagram of a typical 16 beam second embodiment of this invention including an input beam 69, a power amplifier 9 and an output beam 9.
Figure 30:
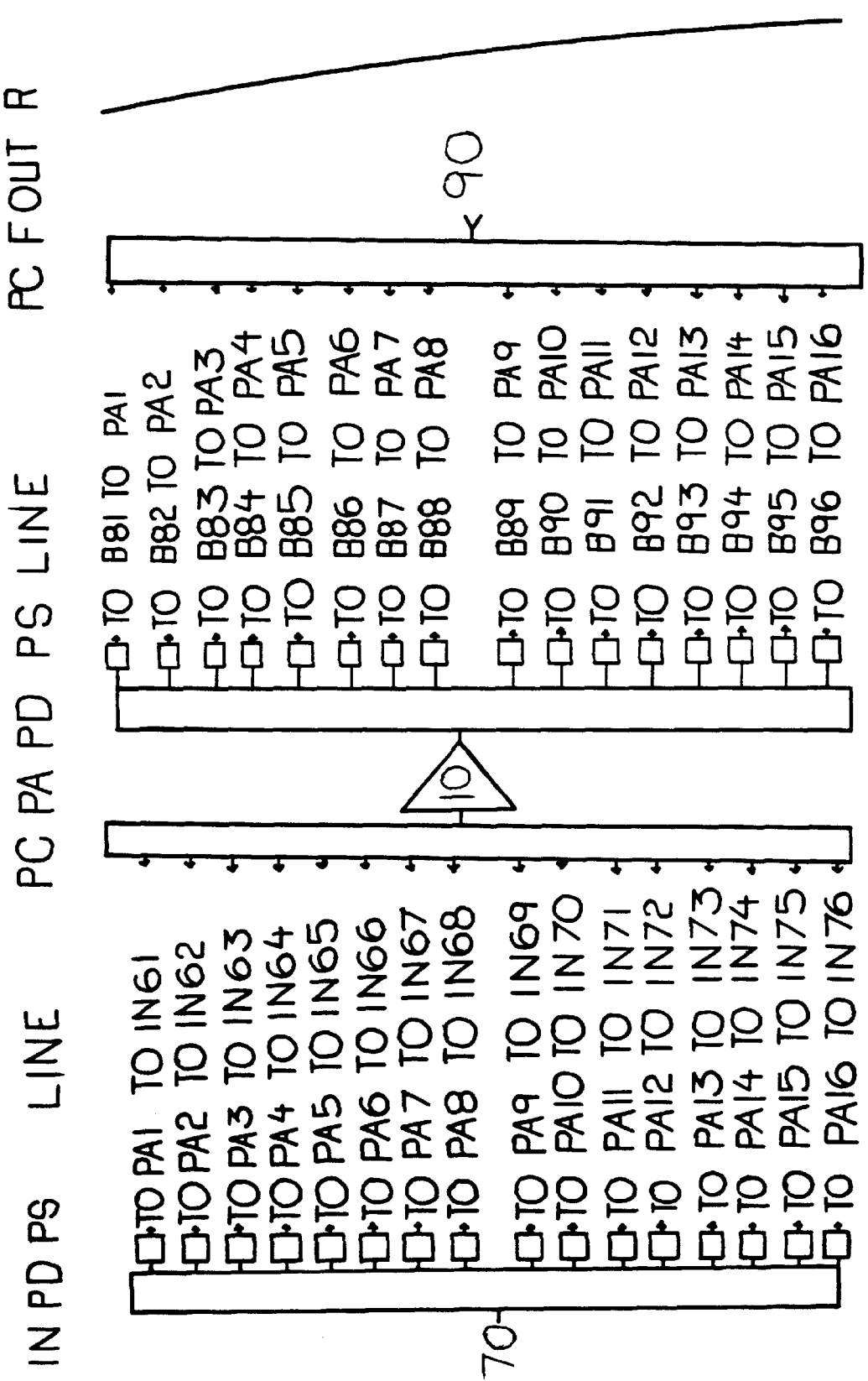
FIG. 30 is a portion of a schematic diagram of a typical 16 beam second embodiment of this invention including an input beam 70, a power amplifier 10 and an output beam 90.
Figure 31:
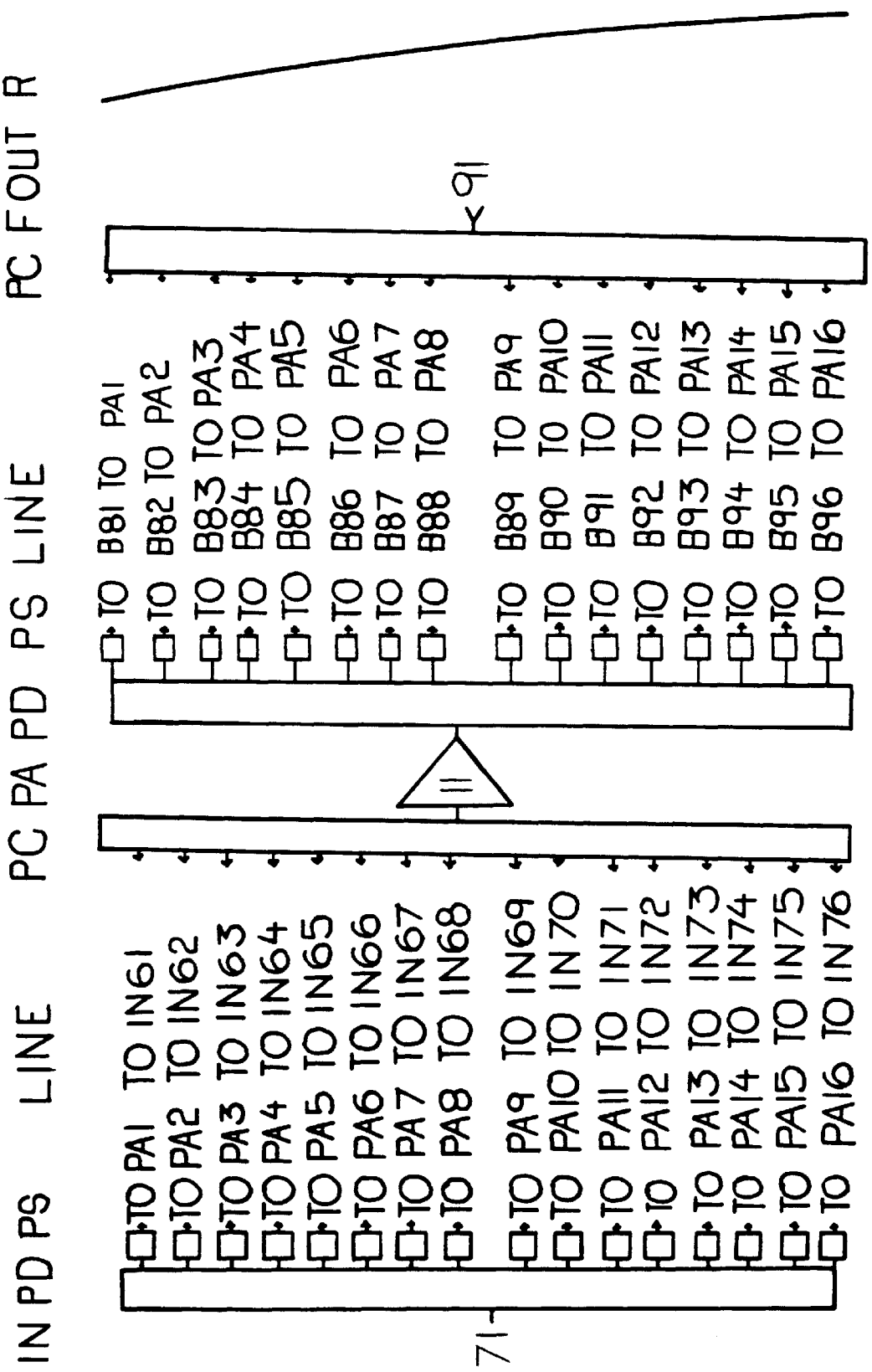
FIG. 31 is a portion of a schematic diagram of a typical 16 beam second embodiment of this invention including an input beam 71, a power amplifier 11 and an output beam 11.
Figure 32:
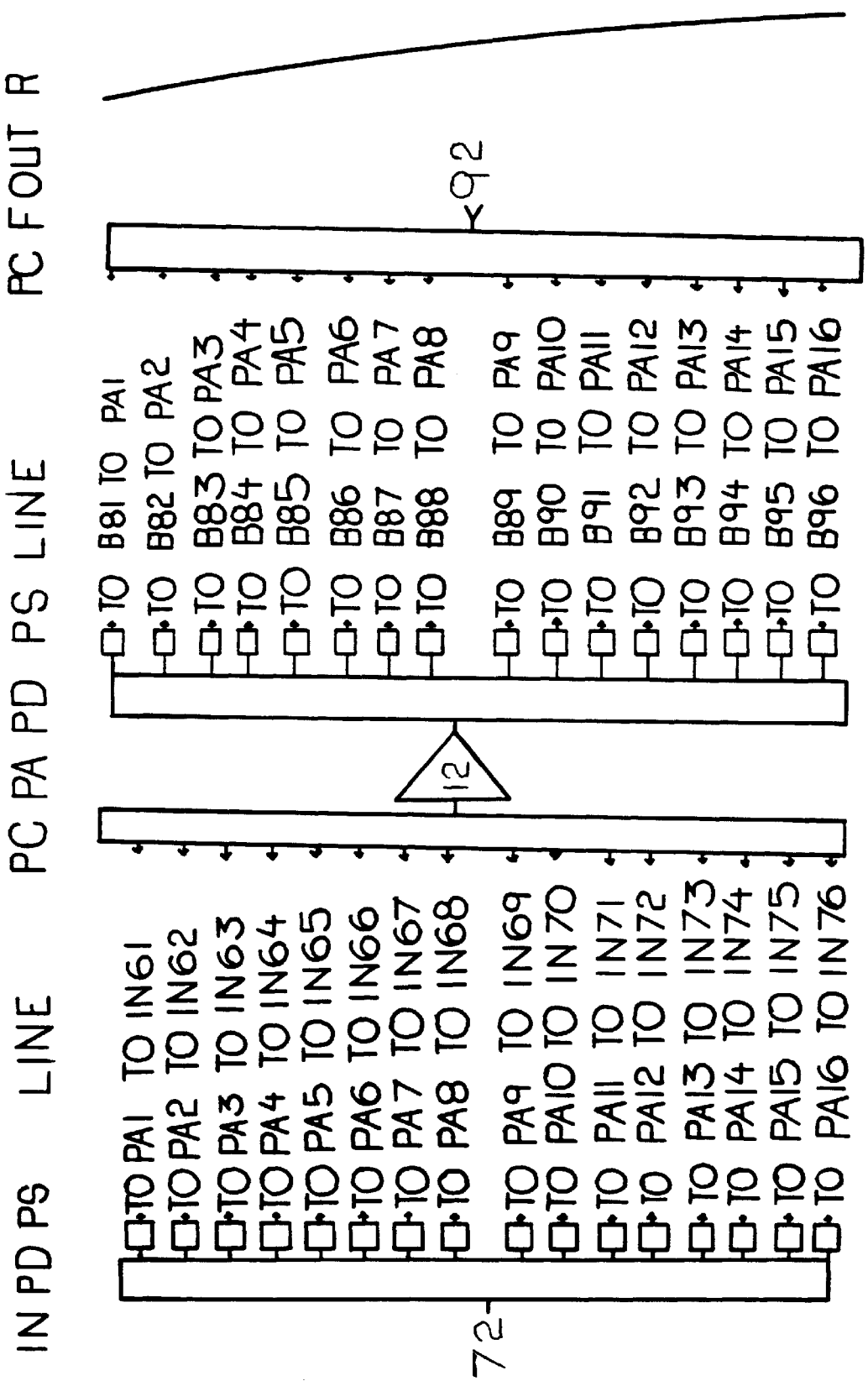
FIG. 32 is a portion of a schematic diagram of a typical 16 beam second embodiment of this invention including an input beam 72, a power amplifier 12 and an output beam 92.
Figure 33:
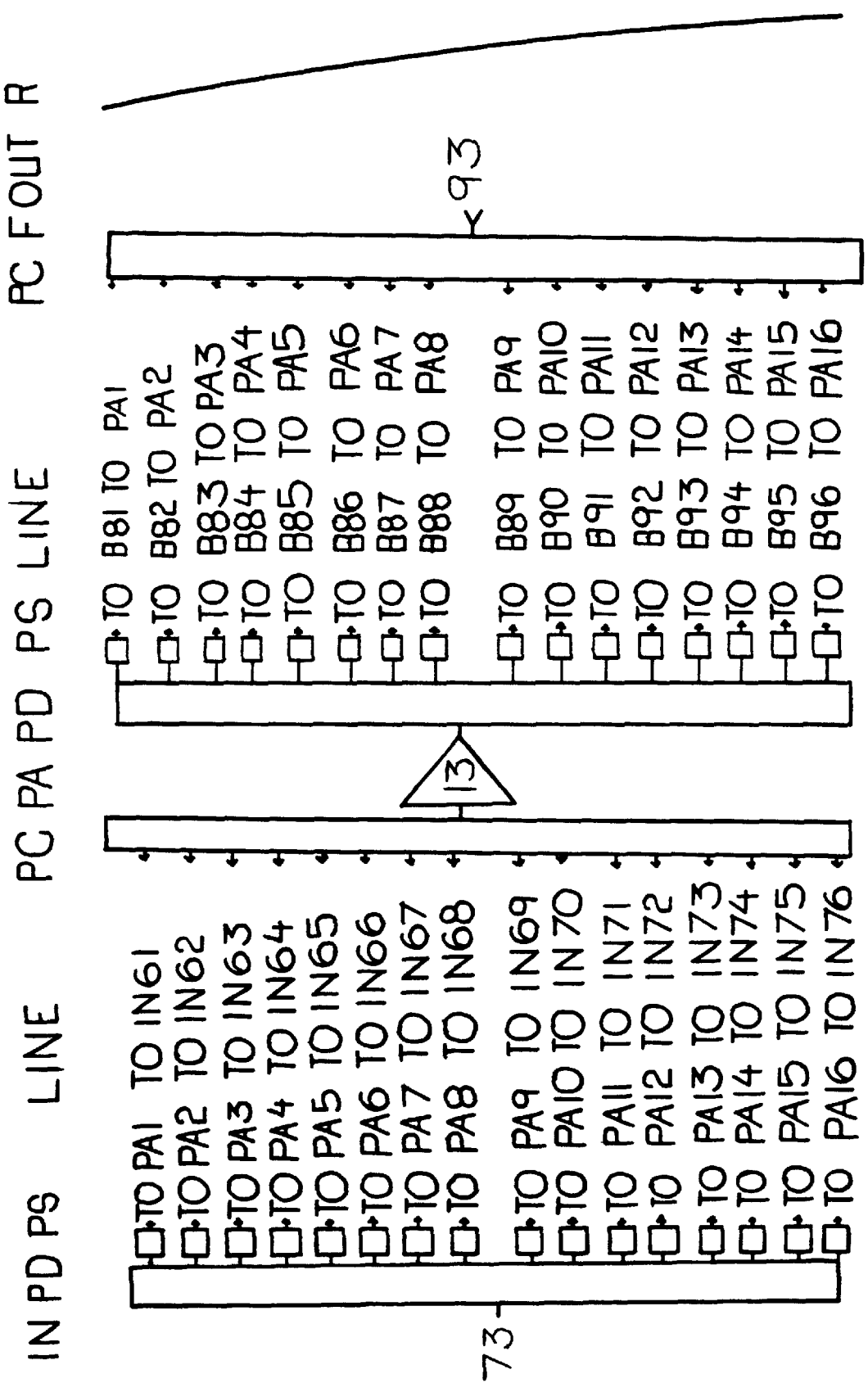
FIG. 33 is a portion of a schematic diagram of a typical 16 beam second embodiment of this invention including an input beam 73, a power amplifier 13 and an output beam 93.

FIG. 20 shows another embodiment of this invention. This is a 4-beam system. This embodiment is identical, from the input to the output phase shifters, to the embodiment shown in FIG. 1. The recitations, from the input to the output phase shifters of FIG. 1, are not repeated here to avoid redundancy. Those recitations are identical to FIG. 1 and FIG. 20.

Each top or the 1st line of each output power divider connected to each power amplifier 1 through 4, is connected, through a separate phase shifter, to the output power combiner (PC) for output beam 81. Each next to the top or the 2nd line, from top, of each output power divider, connected to each power amplifier 1 through 4, is connected, each through a separate phase shifter, to the output power combiner (PC) for output beam 82. Each 3rd line, from top, of each PD, connected to each power amplifier 1 through 4, is connected, each through a separate phase shifter, to the output power combiner (PC) for output beam 83. Each 4th line, from top. of each output power divider, each connected to each power amplifier 1 through 4, is connected, each through a separate phase shifter, to the output power combiner (PC) for output beam 84.

The output of the first output power combiner (PC) is connected to one feed element and provides the output beam 81. The output of the second output power combiner (PC) is connected to one feed element and provides the output beam 82. The output of the third output power combiner (PC) is connected to one feed element and provides the output beam 83. The output of the output power combiner (PC) is connected to one feed element and provides the fourth output beam 84. For a small number of beams, the feed elements are located at or near the focal plane of the relector (R) antenna. In another embodiment, the feed elements are placed off-set from the focal plane of the reflector antenna to avoid (1) blockage of the reflector antenna and (2) to provide a lower level of sidelobe level. A beam from one each feed element impinges on the reflector antenna and is transmitted as the output beam respectively. Output beam 81 is produced by input beam 61 only.

At each transmit beam, signal of only one input beam is in phase by appropriate selection of the set of phase shifters. For example, at the output beam position 81, only signals of the input beam 61 amplified by each of the four amplifiers are in phase. The output signals corresponding to the input beam 62 are out of phase at beam position 81 (B81) from the different power ampifiers (PA) and as such, they cancel one another. The output signals corresponding to the input beam 63 are out of phase at the beam position 81 and as such, they cancel one another. The output signals, from different power amplifiers, corresponding to the input beam 64 are out of phase at the output beam position 81 and as such, they cancel one another. Similarly, the signal at the output beam position 82 is due to only the signal of the input beam 62. The signal at the output beam 83 is due to only the signal of the input beam 63. The signal at the output beam position 84 is due to only the signal of the input beam 64. Each output beam illuminates a separate, overlapping at the edges, receiving area. Signals of beams 62 through 64 are respectively in phase out beams 82 through 84.

FIG. 21 through FIG. 36 depict another n=16-beam embodiment of this invention. The recitations of FIGS. 2 through 17 and FIGS. 21 through 36, from the input to the output phase shifters, are respectively identical and are not repeated here to avoid redundancy.

The top or the 1st output line from each output power divider, 1 through n, is connected, through a separate phase shifter, to the first output power combiner (PC) the number of inputs of which are equal to the number of input beams.

The second output line from each output power divider, 1 through n, is connected, through a separate phase shifter, to the second output power combiner (PC) the number of inputs of which are equal to the number of input beams.

The third through nth output lines from each output power divider, 1 through n, are respectively connected, through a separate phase shifter each, to the third through nth output power combiner (PC) the number of inputs of which are equal to the number of input beams.

The output of the output power combiner (PC) 1 is connected to one feed element (F) for output (OUT) beam 81. The output of the output power combiner (PC) 2 is connected to one feed element (F) for output (OUT) beam 82. The output of the output power combiner (PC) 3 is connected to one feed element (F) for output (OUT) beam 83. The output of the output power combiner (PC) 4 through n is connected to one each feed element (F) for respectively output (OUT) beams 84 through n. Each of the feed element 1 through n is located offset from the focal plane of the reflector (R) antenna. In another embodiment, each feed element is located at the focal plane of the reflector (R) antenna.

The signals arriving at the output power combiner for the output beam 81, corresponding to the input beam 61, arrive in phase and add together. The signals arriving at the output power combiner for the output beam 81, corresponding to the input beam 62, arrive in antiphase and they cancel one another. The signals arriving at the output power combiner for the output beam 81, corresponding to the input beam 63, arrive in antiphase and they cancel one another. Similarly, signals arriving at the output power combiner for the output beam 81, corresponding to each input beam 64 through 76, arrive in antiphase and they cancel one another. The output power combiner of the output beam 81 carry signal of only input beam 61 and signals of each input beam 62 through 76 are cancelled. Each output beam carries signal of its input beam only. At the output power combiner of output beam 82 carries signal of input beam 62 only, signals of input beams 61, 63 through n are respectively in antiphase and cancel one another. Output power combiner 3 through n carries respectively signal only of input beam 63 through n. Signals of beams 62 through 76 are respectively in phase out beams 82 through 96.

There are 1 through q reflector antennas. There are one through r feed elements in each reflector antenna. The feeds are off-set from the prime focus of the reflector antenna to (1) avoid blockage of the reflector antenna and (2) reduce the level of the sidelobes. The table IV gives the values of fixed phase shifts for a 8-beam system.

TABLE IV

| IN BEAM | IN PHASE SHIFT | OUT PHASE SHIFT | OUT BEAM |
| --- | --- | --- | --- |
| 61 | 0 | 0 | 81 |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
| 62 | 90 | 270 | 82 |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
| 63 | 90 | 270 | 83 |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
| 64 | 180 | 180 | 84 |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
| 65 | 90 | 270 | 85 |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
| 66 | 180 | 180 | 86 |
|  | 90 | 270 |  |
|  | 270 | 90 |  |

TABLE IV-continued

| IN BEAM | IN PHASE SHIFT | OUT PHASE SHIFT | OUT BEAM |
|---|---|---|---|
|  | 180 | 180 |  |
|  | 90 | 270 |  |
|  | 0 | 0 |  |
|  | 180 | 180 |  |
|  | 90 | 270 |  |
| 67 | 180 | 180 | 87 |
|  | 90 | 270 |  |
|  | 90 | 270 |  |
|  | 0 | 0 |  |
|  | 90 | 90 |  |
|  | 180 | 180 |  |
|  | 180 | 180 |  |
|  | 90 | 270 |  |
| 68 | 270 | 90 | 88 |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  |

PA1 through PA8, IN 61 through IN68, B81 through b88 of FIGS. 2 through 17 depict a 8-beam system. PA1 through PA8, IN 61 through IN68, B81 through B88 of FIGS. 21 through 36 depict another embodiment of a 8-beam system. The corresponding recitations describe the two embodiments of the 8-beam system. To avoid duplication, figures and recitations, for the two embodiments of the 8-beam system, are not included.

The feed elements are deployable helix antennas in one embodiment. High Tc superconducting cavity backed spiral is described in the application Ser. No. 08/190,533 now abandoned. High Tc superconducting horns are described in the application Ser. No. 08/186,277 now abandoned. They can be used as feed elements.

In another embodiment of this invention, a portion or the entire system is implemented in a monolithic microwave integrated circuit (MMIC) technology. Another objective of this invention is to use a conductive deposition of a film of single crystal high Tc superconductor, such as YBCO), TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another embodiment is a very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Shen, C. Wilker, P. Pang and W. C. Holstein, "High Tc Suoerconducting-sapphire Microwave resonator with Extremely High Q-Values up To 90 K," IEEE MTT-S, Digest, pp. 193–196, 1992. U.S. Pat. Nos. 5,407,904 and 5,407,905 have been issued on high Tc superconducting microwave devices.

There are 1 through n receive beams each having a service area. In each service area there are 1 through z receiving terminals. For example, for the INTELSAT standard A earth station, there is generally one or two earth station(s) for each receiving beam. On the other hand, for a regional cellular satellite system, a receiving service area may have one or more million(s) of terminals depending on the location. A receiving station is comprised of a receiving antenna and a receiver. For a standard A earth station of INTELSAT, the receiving antenna is a paraboloid with a prime focus receiving feed and a complex receiver. For a regional cellular satellite system, the receiving terminal is generally a hand held receiver with a simple quarter wave or a dipole antenna attached to it.

FIG. 37 depicts one receiving area illuminated by one receiving beam. It contains a reflector (R) receiving antenna, a prime focus feed element (F) and a receiver (RCVR). For a large antenna earth station, one or two such stations are located in a receiving area. For a Very Small Antenna Terminal (VSAT) station, such as in a broadcasting satellite receive system, there are many such terminals located in each receiving beam area. For a cellular satellite system, the entire receiving antenna, feed and a receiver are combined in one, preferably hand held, unit. There are many such units located in one cellular satellite receiving area.

It should be understood that the foregoing disclosure relates to only typical embodiments of this invention. and that numerous modifications or alternatives may be made therein, by those of ordinary skill, without departing from the spirit and scope of this invention as set forth in the appended claims. The invention includes different types of government and commercial telecommunication systems, satellites, regional cellular satellites, broadcasting satellites, domestic satellites, terrestrial systems, shipboard systems, aircraft systems, number of beams, all RF, microwave and millimeter wave frequencies, all waveguide embodiments, coaxial embodiments, microstrip embodiments, MMIC embodiments, use of multilayer boards, combination of waveguide, coaxial, microstrip, different types of connecting input and output lines, different types of feed elements, different types of fixed phase shifters, different types of power dividers and combiners, different types of reflector antennas and receivers.

What is claimed is:

1. A telecommunication system having multibeam equally loaded transmitters input beams, input beam power dividers, a set of input phase shifters, power combiners, power amplifiers, output power dividers, a set of output phase shifters, feed elements, a reflector antenna, output beams, receive beams, receiving areas, receive terminals and comprised of;

a transmitting system comprising:
        a plurality of input beams 1 to N;
        a plurality of input power dividerds, 1 to N, each of which divides one of the input beams into N input equally power-divided signals having zero phase difference therebetween;
        a plurality of input fixed phase shifters, each coupled to an input equally power-divided signal;
        a plurality of input power comniners 1 to N, each for combining a set of fixed phase-shifted, input equally power-divided signals, wherein a set includes a fixed phase-shifted, input equally power-divided signal from each of the plurality of input power dividers;

a plurality of power amplifiers 1 to N, each for amplifying a respective output of the input power combiners;

each power amplifier being equally loaded under dynamic traffic conditions decreasing the total transmitter power requirement and increasing the transmitter efficiency;

a plurality of output power dividers 1 to N, each of which equally divides a respective power amplifier output signal into N output equally power-divided signals having zero phase difference therebetween;

a plurality of output fixed phase shifters, each connected to a respective output equally power-divided signal;

a plurality of feed elements, each connected to a fixed phase-shifted, output equally power-divided signal and located offset from the prime focus of a reflector antenna;

values of fixed phase shifts in the input and the corresponding output, for a 4 beam system, being given in the following table I:

TABLE I

| 4 BEAM SYSTEM | | | |
|---|---|---|---|
| INPUT BEAM | INPUT PHASE | OUTPUT PHASE | OUTPUT BEAM |
| 61 | 0 | 0 | 84 |
|  | 90 | 270 |  |
|  | 90 | 270 |  |
|  | 180 | 180 |  |
| 62 | 90 | 270 | 83 |
|  | 180 | 180 |  |
|  | 0 | 0 |  |
|  | 90 | 270 |  |
| 63 | 90 | 270 | 82 |
|  | 0 | 0 |  |
|  | 180 | 180 |  |
|  | 90 | 270 |  |
| 64 | 180 | 180 | 81 |
|  | 90 | 270 |  |
|  | 90 | 270 |  |
|  | 0 | 0 |  | values of phase shifts in the input and the corresponding output, for a 16 beam system, being given in the following table II:

TABLE II

| 16 BEAM SYSTEM | | | |
|---|---|---|---|
| IN BEAM | IN PHASE | OUT PHASE | OUT BEAM |
| 61 | 0 | 0 | 81 |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |

TABLE II-continued

| 16 BEAM SYSTEM | | | |
|---|---|---|---|
| IN BEAM | IN PHASE | OUT PHASE | OUT BEAM |
| 62 | 90 | 270 | 82 |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | 0 | 0 |  |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
| 63 | 90 | 270 | 83 |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
|  | 180 | 180 |  |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
| 64 | 180 | 180 | 84 |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
| 65 | 90 | 270 | 85 |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
| 66 | 180 | 180 | 86 |
|  | 270 | 90 |  |
|  | 90 | 270 |  |
|  | 180 | 180 |  |
|  | 270 | 90 |  |
|  | 0 | 0 |  |

TABLE II-continued

16 BEAM SYSTEM

| IN BEAM | IN PHASE | OUT PHASE | OUT BEAM |
|---|---|---|---|
| | 180 | 180 | |
| | 270 | 90 | |
| | 90 | 270 | |
| | 180 | 180 | |
| | 0 | 0 | |
| | 90 | 270 | |
| | 180 | 180 | |
| | 270 | 90 | |
| | 90 | 270 | |
| | 180 | 180 | |
| | — | — | |
| 67 | 180 | 180 | 87 |
| | 270 | 90 | |
| | 90 | 270 | |
| | 180 | 180 | |
| | 90 | 270 | |
| | 180 | 180 | |
| | 0 | 0 | |
| | 90 | 270 | |
| | 270 | 90 | |
| | 0 | 0 | |
| | 180 | 180 | |
| | 270 | 90 | |
| | 180 | 180 | |
| | 270 | 90 | |
| | 90 | 270 | |
| | 180 | 180 | |
| | — | — | |
| 68 | 270 | 90 | 88 |
| | 0 | 0 | |
| | 180 | 180 | |
| | 270 | 90 | |
| | 180 | 180 | |
| | 270 | 90 | |
| | 90 | 270 | |
| | 180 | 180 | |
| | 180 | 180 | |
| | 270 | 90 | |
| | 90 | 270 | |
| | 180 | 180 | |
| | 90 | 270 | |
| | 180 | 180 | |
| | 0 | 0 | |
| | 90 | 270 | |
| | — | — | |
| 69 | 90 | 270 | 89 |
| | 0 | 0 | |
| | 180 | 180 | |
| | 90 | 270 | |
| | 180 | 180 | |
| | 90 | 270 | |
| | 270 | 90 | |
| | 180 | 180 | |
| | 180 | 180 | |
| | 90 | 270 | |
| | 270 | 90 | |
| | 180 | 180 | |
| | 270 | 90 | |
| | 180 | 180 | |
| | 0 | 0 | |
| | 270 | 90 | |
| | — | — | |
| 70 | 180 | 180 | 90 |
| | 90 | 270 | |
| | 270 | 90 | |
| | 180 | 180 | |
| | 270 | 90 | |
| | 180 | 180 | |
| | 0 | 0 | |
| | 270 | 90 | |
| | 90 | 270 | |
| | 0 | 0 | |
| | 180 | 180 | |
| | 90 | 270 | |
| | 180 | 180 | |
| | 90 | 270 | |
| | 270 | 90 | |
| | 180 | 180 | |
| | — | — | |
| 71 | 180 | 180 | 91 |
| | 90 | 270 | |
| | 270 | 90 | |
| | 180 | 180 | |
| | 90 | 270 | |
| | 0 | 0 | |
| | 180 | 180 | |
| | 90 | 270 | |
| | 270 | 90 | |
| | 180 | 180 | |
| | 0 | 0 | |
| | 270 | 90 | |
| | 180 | 180 | |
| | 90 | 270 | |
| | 270 | 90 | |
| | 180 | 180 | |
| | — | — | |
| 72 | 270 | 90 | 92 |
| | 180 | 180 | |
| | 0 | 0 | |
| | 270 | 90 | |
| | 180 | 180 | |
| | 90 | 270 | |
| | 270 | 90 | |
| | 180 | 180 | |
| | 180 | 180 | |
| | 90 | 270 | |
| | 270 | 90 | |
| | 180 | 180 | |
| | 90 | 270 | |
| | 0 | 0 | |
| | 180 | 180 | |
| | 90 | 270 | |
| | — | — | |
| 73 | 180 | 180 | 93 |
| | 90 | 270 | |
| | 90 | 270 | |
| | 0 | 0 | |
| | 270 | 90 | |
| | 180 | 180 | |
| | 180 | 180 | |
| | 90 | 270 | |
| | 270 | 90 | |
| | 180 | 180 | |
| | 180 | 180 | |
| | 90 | 270 | |
| | 0 | 0 | |
| | 270 | 90 | |
| | 270 | 90 | |
| | 180 | 180 | |
| | — | — | |
| 74 | 270 | 90 | 94 |
| | 180 | 180 | |
| | 180 | 180 | |
| | 90 | 270 | |
| | 0 | 0 | |
| | 270 | 90 | |
| | 270 | 90 | |
| | 180 | 180 | |
| | 180 | 180 | |
| | 90 | 270 | |
| | 90 | 270 | |
| | 0 | 0 | |
| | 270 | 90 | |
| | 180 | 180 | |
| | 180 | 180 | |
| | 90 | 270 | |
| | — | — | |
| 75 | 270 | 90 | 95 |
| | 180 | 180 | |
| | 180 | 180 | |

TABLE II-continued

16 BEAM SYSTEM

| IN BEAM | IN PHASE | OUT PHASE | OUT BEAM |
|---|---|---|---|
|  | 90 | 270 |  |
|  | 180 | 180 |  |
|  | 90 | 270 |  |
|  | 90 | 270 |  |
|  | 0 | 0 |  |
|  | 0 | 0 |  |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | — | — |  |
| 76 | 0 | 0 | 96 |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  | wherein a plurality of output beams 1 to N are formed, each beam comprising a set of N feed elements; and wherein a set of feed elements comprises a fixed phase-shifted, output equal power-divided signal from each of the N output power dividers; and wherein signals arriving at the feed elements for an input beam "b", of the 1 to N beams, corresponding to an input beam "b", arrive in phase and add together, while signals arriving at said feed elements for the output beam "b" corresponding to remaining input beams which arrive in antiphase and cancel one another by appropriate selection of said two sets of fixed phase shifters;

a receiving system comprising:
1 through n received beams, corresponding to transmit beams, each having a service area;
each said receive area having 1 through z receive terminals;
each receive terminal having a receive reflector antenna, a prime focus feed element and a receiver; and
one telecommunication system having said corresponding input beams, said output beams, said receive beams, and receive terminals.

2. An efficient satellite multibeam equally loaded transmitters of claim 1;
wherein said multibeam transmitters being comprised of waveguides.

3. An efficient satellite multibeam equally loaded transmitters of claim 2
wherein the waveguides of said multibeam transmitters being comprised of a high Tc single crystal high Tc superconductor;
said feed elements being comprised of a single crystal high Tc superconductor; and
said multibeam transmitters being operated at a high superconducting temperature.

4. An efficient satellite multibeam equally loaded transmitters of claim 2
wherein the waveguides of said multibeam transmitters being comprised of a single crystal dielectric material having interior surfaces which are deposited with a film of a single crystal high Tc superconductor;
said feed elements being comprised of a single crystal dielectric material having inner surfaces which being deposited with a film of a single crystal high Tc superconductor; and
said multibeam transmitters being operated at a high superconducting temperature.

5. An efficient satellite multibeam equally loaded transmitters of claim 3;
wherein said reflector antenna being comprised of a single crystal high Tc superconductor having a Q of 1 million at microwave frequencies.

6. An efficient satellite multibeam equally loaded transmitters of claim 4;
wherein said reflector antenna being comprised of a single crystal dielectric material having reflecting surfaces which being deposited with a film of a single crystal high Tc superconductor having a Q of 1 million.

7. A monolithic, efficient satellite multibeam equally loaded transmitters of claim 1;
wherein said input power dividers, a set of input first phase shifters, power combiners, power amplifiers, output power dividers, a set of output phase shifters being MMIC.

8. A monolithic, efficient satellite multibeam equally loaded transmitters of claim 7;
wherein the conducting depositions of said microstrip lines being comprised of a film of a single crystal high Tc superconductor; and
said multibeam transmitters being operated at a high superconducting temperature.

9. A telecommunication system having multibeam equally loaded transmitters, input beams, input beam power dividers, a set of input phase shifters, power combiners, power amplifiers, output power dividers, a set of output phase shifters, feed elements, output power combiners, reflector antenna, output beams, receive beams, receiving areas, receive terminals and comprised of;
a transmitting system comprised of:
a plurality of input beams 1 to N;
a plurality of input power dividerds, 1 to N, each of which divides one of the input beams into N input equally power-divided signals having zero phase difference therebetween;
a plurality of input fixed phase shifters, each connected to an input equally power-divided signal;
a plurality of input power comniners 1 to N, each for combining a set of fixed phase-shifted, input equally power-divided signals, wherein a set includes a fixed phase-shifted, input equally power-divided signal from each of the plurality of input power dividers;
a plurality of power amplifiers 1 to N, each for amplifying a respective output of the input power combiners;
each power amplifier being equally loaded under dynamic traffic conditions decreasing the total transmitter power requirement and increasing the transmitter efficiency;
a plurality of output power dividers 1 to N, each of which equally divides a respective power amplifier output signal into N output equally power-divided signals having zero phase difference therebetween;
a plurality of output fixed phase shifters, each connected to a respective output equally power-divided signal;
values of fixed phase shifts in the input and the corresponding output, for a 4 beam system, being given in the following table I:

TABLE I

4 BEAM SYSTEM

| INPUT BEAM | INPUT PHASE | OUTPUT PHASE | OUTPUT BEAM |
|---|---|---|---|
| 61 | 0 | 0 | 84 |
|  | 90 | 270 |  |
|  | 90 | 270 |  |
|  | 180 | 180 |  |
| 62 | 90 | 270 | 83 |
|  | 180 | 180 |  |
|  | 0 | 0 |  |
|  | 90 | 270 |  |
| 63 | 90 | 270 | 82 |
|  | 0 | 0 |  |
|  | 180 | 180 |  |
|  | 90 | 270 |  |
| 64 | 180 | 180 | 81 |
|  | 90 | 270 |  |
|  | 90 | 270 |  |
|  | 0 | 0 |  | values of phase shifts in the input and the corresponding output, for a 16 beam system, being given in the following table II:

TABLE II

16 BEAM SYSTEM

| IN BEAM | IN PHASE | OUT PHASE | OUT BEAM |
|---|---|---|---|
| 61 | 0 | 0 | 81 |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | — | — |  |
| 62 | 90 | 270 | 82 |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | 0 | 0 |  |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | — | — |  |
| 63 | 90 | 270 | 83 |
|  | 180 | 180 |  |

TABLE II-continued

16 BEAM SYSTEM

| IN BEAM | IN PHASE | OUT PHASE | OUT BEAM |
|---|---|---|---|
|  | 180 | 180 |  |
|  | 270 | 90 |  |
|  | 0 | 0 |  |
|  | 90 | 270 |  |
|  | 90 | 270 |  |
|  | 180 | 180 |  |
|  | 180 | 180 |  |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | — | — |  |
| 64 | 180 | 180 | 84 |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
|  | — | — |  |
| 65 | 90 | 270 | 85 |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
|  | — | — |  |
| 66 | 180 | 180 | 86 |
|  | 270 | 90 |  |
|  | 90 | 270 |  |
|  | 186 | 180 |  |
|  | 270 | 90 |  |
|  | 0 | 0 |  |
|  | 180 | 180 |  |
|  | 270 | 90 |  |
|  | 90 | 270 |  |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | — | — |  |
| 67 | 180 | 180 | 87 |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | 270 | 90 |  |

TABLE II-continued

16 BEAM SYSTEM

| IN BEAM | IN PHASE | OUT PHASE | OUT BEAM |
|---|---|---|---|
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |
|  | — | — |  |
| 68 | 270 | 90 | 88 |
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | — | — |  |
| 69 | 90 | 270 | 89 |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | — | — |  |
| 70 | 180 | 180 | 90 |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | 90 | 270 |  |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | — | — |  |
| 71 | 180 | 180 | 91 |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | 270 | 90 |  |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | — | — |  |
| 72 | 270 | 90 | 92 |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | — | — |  |
| 73 | 180 | 180 | 93 |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | — | — |  |
| 74 | 270 | 90 | 94 |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | 180 | 180 |  |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | — | — |  |
| 75 | 270 | 90 | 95 |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  |
|  | 0 | 0 |  |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | — | — |  |
| 76 | 0 | 0 | 96 |
|  | 270 | 90 |  |
|  | 270 | 90 |  |
|  | 180 | 180 |  |
|  | 270 | 90 |  |
|  | 180 | 180 |  |

TABLE II-continued

16 BEAM SYSTEM

| IN BEAM | IN PHASE | OUT PHASE | OUT BEAM |
|---|---|---|---|
|  | 180 | 180 |  |
|  | 90 | 270 |  |
|  | 270 | 90 |  |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  | a plurality of output power combiners 1 to N, each for combining a set of fixed phase-shifted, output equally power-divided signals, wherein a set includes a fixed phase-shifted, output equally power-divided signal from each of the plurality of the output power dividers; and a plurality of feed elements 1 to N, each connected to an output of a respective output power combiner and each located offset from the prime focus of a reflector antenna, for forming a plurality of output beams 1 to N; and wherein signals arriving at the feed elements for an input beam "b", of the 1 to N beams, corresponding to an input beam "b", arrive in phase and add together, while signals arriving at said feed elements for the output beam "b" corresponding to remaining input beams which arrive in antiphase and cancel one another by appropriate selection of said two sets of fixed phase shifters;

a receiving system comprising;

1 through n received beams, corresponding to transmit, beams each having a service area each said receive area having 1 through z receive terminals;

each receive terminal having a receive reflector, a prime focus feed element and a receiver; and one telecommunication system having said corresponding input beams, said output beams, said receive beams, and receive terminals.

10. An efficient satellite multibeam equally loaded transmitters of claim 9;

wherein said multibeam transmitters being comprised of waveguides.

11. An efficient satellite multibeam equally loaded transmitters of claim 10;

wherein the waveguides of said multibeam transmitters being comprised of a high Tc single crystal high Tc superconductor;

said feed elements being comprised of a single crystal high Tc superconductor; and said multibeam transmitters being operated at a high superconducting temperature.

12. An efficient satellite multibeam equally loaded transmitters of claim 11;

wherein the waveguides of said multibeam transmitters being comprised of a single crystal dielectric material having interior surfaces which are deposited with a film of a single crystal high Tc superconductor;

said feed elements being comprised of a single crystal dielectric material having inner surfaces which being deposited with a film of a single crystal high Tc superconductor; and said multibeam transmitters being operated at a high superconducting temperature.

13. An efficient satellite multibeam equally loaded transmitters of claim 12;

wherein said reflector antenna being comprised of a single crystal high Tc superconductor having a Q of 1 million at microwave frequencies.

14. An efficient satellite multibeam equally loaded transmitters of claim 13;

wherein said reflector antenna being comprised of a single crystal dielectric material having reflecting surfaces which being deposited with a film of a single crystal high Tc superconductor having a Q of 1 million.

15. A monolithic, efficient satellite multibeam equally loaded transmitters of claim 9;

wherein said input power dividers, a set of input first phase shifters, power combiners, power amplifiers, output power dividers, a set of output phase shifters being MMIC.

16. A telecommunication system having multibeam equally loaded transmitters input beams, input beam power dividers, a set of input phase shifters power combiners, power amplifiers, input lines, output power dividers, a set of output phase shifters, feed elements, output lines, output power combiners, a reflector antenna, output beams, receive beams, receiving areas, receive terminals and comprised of;

a plurality of input beams 1 to N;

a plurality of input power dividerds, 1 to N, each of which divides one of the input beams into N input equally power-divided signals having zero phase difference therebetween;

a plurality of input fixed phase shifters, each coupled to an input equally power-divided signal;

a plurality of input power comniners 1 to N, each for combining a set of fixed phase-shifted, input equally power-divided signals, wherein a set includes a fixed phase-shifted, input equally power-divided signal from each of the plurality of input power dividers;

a plurality of power amplifiers 1 to N, each for amplifying a respective output of the input power combiners;

each power amplifier being equally loaded under dynamic traffic conditions decreasing the total amplifier power requirement and increasing the transmitter efficiency;

a plurality of output power dividers 1 to N, each of which equally divides a respective power amplifier output signal into N output equally power-divided signals having zero phase difference therebetween;

a plurality of output fixed phase shifters, each connected to a respective output equally power-divided signal;

values of fixed phase shifts in the input and the corresponding output, for a 4 beam system, being given in the following table I:

TABLE 1

4 BEAM SYSTEM

| INPUT BEAM | INPUT PHASE | OUTPUT PHASE | OUTPUT BEAM |
|---|---|---|---|
| 61 | 0 | 0 | 84 |
|  | 90 | 270 |  |
|  | 90 | 270 |  |
|  | 180 | 180 |  |
| 62 | 90 | 270 | 83 |
|  | 180 | 180 |  |
|  | 0 | 0 |  |

TABLE 1-continued

4 BEAM SYSTEM

| INPUT BEAM | INPUT PHASE | OUTPUT PHASE | OUTPUT BEAM |
|---|---|---|---|
|  | 90 | 270 |  |
| 63 | 90 | 270 | 82 |
|  | 0 | 0 |  |
|  | 180 | 180 |  |
|  | 90 | 270 |  |
| 64 | 180 | 180 | 81 |
|  | 90 | 270 |  |
|  | 90 | 270 |  |
|  | 0 | 0 |  | values of phase shifts in the input and the corresponding output, for a 16 beam system, being given in the following table II:

TABLE II

16 BEAM SYSTEM

| IN BEAM | IN PHASE | OUT PHASE | OUT BEAM |
|---|---|---|---|
| 61 | 0 | 0 | 81 |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
| 62 | 90 | 270 | 82 |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | 0 | 0 |  |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
| 63 | 90 | 270 | 83 |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
|  | 180 | 180 |  |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
| 64 | 180 | 180 | 84 |

TABLE II-continued

16 BEAM SYSTEM

| IN BEAM | IN PHASE | OUT PHASE | OUT BEAM |
|---|---|---|---|
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
| 65 | 90 | 270 | 85 |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
| 66 | 180 | 180 | 86 |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
|  | 90 | 270 |  |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
| 67 | 180 | 180 | 87 |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | 270 | 90 |  |
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |
| 68 | 270 | 90 | 88 |
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |

TABLE II-continued

16 BEAM SYSTEM

| IN BEAM | IN PHASE | OUT PHASE | OUT BEAM |
|---|---|---|---|
|  | 180 | 180 |  |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | — | — |  |
| 69 | 90 | 270 | 89 |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | — | — |  |
| 70 | 180 | 180 | 90 |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | 90 | 270 |  |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | — | — |  |
| 71 | 180 | 180 | 91 |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | 270 | 90 |  |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | — | — |  |
| 72 | 270 | 90 | 92 |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | — | — |  |
| 73 | 180 | 180 | 93 |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | — | — |  |
| 74 | 270 | 90 | 94 |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | 180 | 180 |  |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | — | — |  |
| 75 | 270 | 90 | 95 |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  |
|  | 0 | 0 |  |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | — | — |  |
| 76 | 0 | 0 | 96 |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  | a plurality of output power comniners 1 to N, each for combining a set of fixed phase-shifted, output equally power-divided signals, wherein a set includes a fixed phase-shifted, output equally power-divided signal from each of the plurality of the output power dividers; and a plurality of feed elements 1 to N, each connected to an output of a respective output power combiner and each located offset from the prime focus of a reflector antenna, for forming a plurality of output beams 1 to N; and wherein signals arriving at the feed elements for an input beam "b", of the 1 to N beams, corresponding to an input beam "b", arrive in phase and add together, while signals arriving at said feed elements for the output beam "b" corresponding to remaining input beams which arrive in antiphase and cancel one another by appropriate selection of said two sets of fixed phase shifters;

said input power dividers, said set of input first phase shifters, power combiners, power amplifiers, said set of output phase shifters being MMIC;

a receiving system comprising:
1 through n received beam, corresponding to transmit, beams each having a service area;

each said receive area having 1 through z receive terminals;

each receive terminal having a receive reflector, a prime focus feed element and a receiver; and one telecommunication system having said ccorresponding input beams, said output beams, said receive beams, and receive terminals.

17. A monolithic, efficient satellite multibeam equally loaded transmitters of claim 16;

wherein the conducting depositions of said microstrip lines being comprised of a film of a single crystal high Tc superconductor; and said multibeam transmitters being operated at a high superconducting temperature.

18. A monolithic, efficient satellite multibeam equally loaded transmitters of claim 17;

wherein the receiving system is a cellular hand held transmit-receive equipment.

* * * * *